United States Patent

[11] 3,557,315

[72] Inventors Stanislas Kobus
Antwerp, Belgium;
Adelin Eugene Gaston Salle, Paris, France;
Bernard Jean Robert Fontaine, Antwerp;
Alois Rene Termote, Edegem; Jean Louis
Masure, Wilrijk, Belgium

[21] Appl. No. 698,870
[22] Filed Jan. 18, 1968
[45] Patented Jan. 19, 1971
[73] Assignee International Standard Electric Corporation
New York, N.Y.
a corporation of Delaware
[32] Priority Jan. 23, 1967
[33] Netherlands
[31] 6701050

[54] AUTOMATIC TELECOMMUNICATION SWITCHING SYSTEM AND INFORMATION HANDLING SYSTEM
36 Claims, 14 Drawing Figs.

[52] U.S. Cl. .......... 179/15
[51] Int. Cl. .......... H04g 3/54
[50] Field of Search .......... 179/18.211, 18SP

[56] References Cited

UNITED STATES PATENTS 3,365,548 1/1968 Lucas .......... 179/18(.211)
3,423,539 1/1969 Page .......... 179/18(.211)

*Primary Examiner*—Ralph D. Blakeslee
*Attorneys*—C. Cornell Remsen, Jr., Rayson P. Morris, Percy P. Lantzy, J. Warren Whitesel, Phillip A. Weiss and Delbert P. Warner

ABSTRACT: The present system includes two programmed processors and a plurality of identical peripheral modules each comprising a switching network part and two network control circuits which are each permanently connected to a respective one of the two processors by transmission means. Both processors operate on a load-sharing basis and continuously inform one another about the characteristic phases of the operations performed in order that a correctly operating processor should be able to takeover the already started operations of a faulty processor. This continuous exchange of information is performed during interprocessor interrupt programs which are programs of highest priority. In decreasing order of priority, the other programs that are used include a clock interrupt program, an asynchronous switching interrupt program and a base level program. The system also includes means to detect a faulty processor by traffic comparison.

PATENTED JAN 19 1971 3,557,315

SHEET 01 OF 14

Inventor

Figure 1:
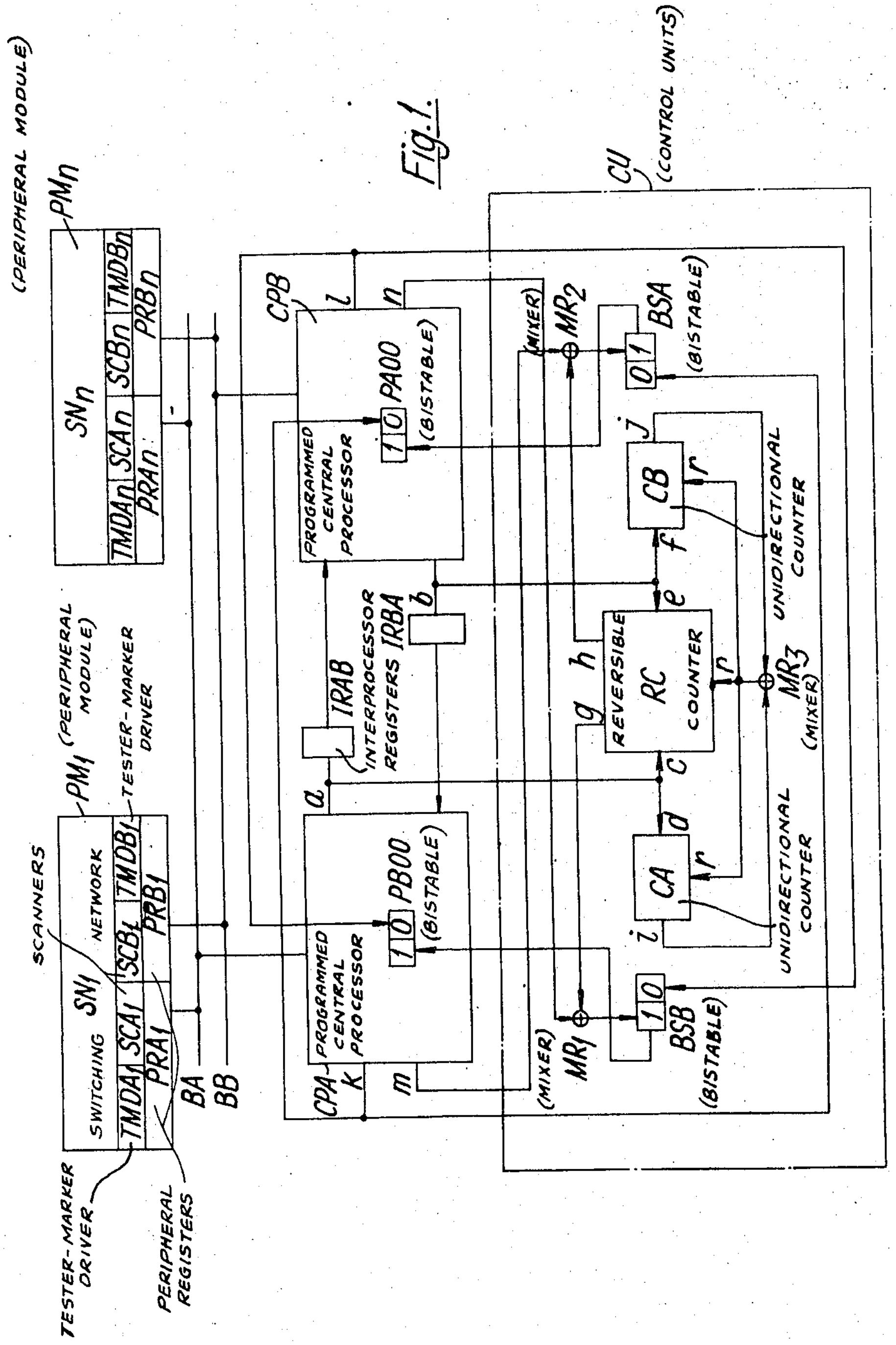

S. Kobus, A. Salle, B. Fontaine, A. Termote and J. Masure

By

Attorney

Inventor

S. Kobus, A. Salle, B. Fontaine, A. Termote and J. Masure

By

Attorney

*Inventor*

S. Kobus, A. Salle, B. Fontaine, A. Termote and J. Masure

*By*

*Attorney*

Inventor

S. Kobus, A. Salle, B. Fontaine, A. Termote and J. Masure

By

[signature]

Attorney

Inventor
S. Kobus, A. Salle, B. Fontaine, A. Termote and
J. Masure

By
Attorney

*Inventor*

S. Kobus, A. Salle, B. Fontaine, A. Termote and J. Masure

By

*Attorney*

Inventor
S. Kobus, A. Salle, B. Fontaine, A. Termote and J. Masure
By [signature]
Attorney Inventor S. Kobus, A. Salle, B. Fontaine, A. Termote and J. Masure By Attorney S. Kobus, A. Salle, B. Fontaine, A. Termote and J. Masure Inventor By Attorney Inventor
S. Kobus, A. Salle, B. Fontaine, A. Termote and J. Masure
By
Attorney

*Inventor*

S. Kobus, A. Salle, B. Fontaine, A. Termote and J. Masure

By

*Attorney*

Inventor
S. Kobus - A. Salle
B. Fontaine, A. Termote
and J. Masure
By
Attorney

*Inventor*
S. Kobus, A. Salle, B. Fontaine, A. Termote
and J. Masure
*By*
*Attorney*

Inventor

S. Kobus, A. Salle, B. Fontaine, A. Termote and J. Masure

By

Attorney

AUTOMATIC TELECOMMUNICATION SWITCHING SYSTEM AND INFORMATION HANDLING SYSTEM

The present invention relates to an automatic telecommunication switching system including a switching network and a programmed control system for said switching network, said control system including at least two programmed processors which simultaneously and actively control the whole of said network.

Such a system is already known from the article "Programmation et securite des autocommutateurs electroniques" by J. Duquesne, C. Dillet, J. P. Berger et R. Brunel and published in "Commutation et Electronique" No. 10, Oct. 1965. In this system each processor may handle half of the total traffic provided that, as disclosed, measures are taken to cope with the access between the processors and the switching network. When both processors operating together each handle half of the total traffic for a given quality of service, it is not necessary that each processor operating solely should ensure the same total traffic with the same quality of service, a decrease of the latter being tolerated since a processor will operate alone only occasionally during limited periods of time and since the probability of these coinciding with the busy hour is small so that in most cases the quality of service will not be decreased at all. However, in this known system, when a fault appears in a processor the latter is taken out of service and all the communication control operations performed by this processor are abandoned.

The electronic switching system described in the Bell System Technical Journal of Sept. 1964 also includes two processors and although having the advantage that when one processor is taken out of service the other continues all the control operations being performed by this processor, this system has the disadvantage that only one processor at a time actively controls the switching network, the other processor being in a standby condition, so that at all times the actively operating processor must handle the total traffic of the system with a predetermined quality of service.

It is therefore an object of the present invention to provide an automatic telecommunication switching system which, while maintaining the above advantages of the known systems, does not have the disadvantages thereof.

The present automatic telecommunication switching system is characterized in this, that it further includes transmission means for transmitting information concerning communication control operations performed in said switching network by each one of said processors at least one of the other processors.

Another characteristic of the present automatic telecommunication switching system is that each said processor includes memory means to store information words regarding communication control operations and that each information word contains an indication of the processor handling the corresponding communication control operation each processor using only the words associated thereto.

A further characteristic of the present automatic telecommunication switching system is that said transmitted information enables said other processor(s) to further handle the communication control operations previously undertaken by each said one processor when the latter becomes faulty.

Still a further characteristic of the present automatic telecommunication switching system is that when a said one processor becomes faulty each of said other processors starts a takeover operation which consists in interrogating its said memory means to detect the words stored therein with an indication that they concern communication control operations handled by the faulty processor and in taking over these communication control operations by means of the information stored in these words.

In this manner a load sharing system can be adopted for the two processors while avoiding the loss of established communications when a fault develops in a processor controlling them. It moreover appears that the further handling of these communications by a correctly operating processor does not require operations to be performed in the network by this processor since all necessary information is already stored in the words detected during the takeover operation. From this it also follows that the takeover operation can be performed in a minimum of time.

The present automatic telecommunication switching system is further characterized in that memory means included in each one of said processors store a base level program; a clock interrupt program and an interprocessor interrupt program, and that said system includes a clock interrupt source and interprocessor interrupt sources said clock interrupt source when operated being able to temporarily interrupt said base level program and to start said clock interrupt program, whereas said interprocessor interrupt sources when operated are able to temporarily interrupt said base level program or said clock interrupt program and to start said interprocessor interrupt program during which said information is transmitted to at least one of the other processors by said transmission means.

Another characteristic of the present automatic telecommunication switching system is that said base level program includes a maintenance subprogram.

Thus the present system is advantageous over that disclosed in the above Bell System Technical Journal since in this known system there are provided high priority maintenance programs which are executed upon the detection of a faulty active processor.

The present invention also relates to an automatic telecommunication switching system including a switching network and a programmed control system for said switching network, said control system including at least two programmed processors which simultaneously and actively control the whole of said network, characterized in this, that said switching network includes switching means and a plurality of network control means which have access to the whole of said switching means and which are each permanently connected via a single transmission means to a distinct one of said processors.

This system is of a simpler structure than the last mentioned known system which is "articulated" i.e. each processor has access to any of the network control means via corresponding transmission means. The simple structure of the present system is the direct result of the fact that it works on a load sharing basis contrary to the known system which includes only a single active processor.

The present invention also relates to an information handling system including at least two programmed processors which are able to simultaneously and actively perform distinct control operations characterized in this, that it further includes transmission means for transmitting information concerning said control operations performed by each one of said processors to at least one of the other processors.

Figure 7:
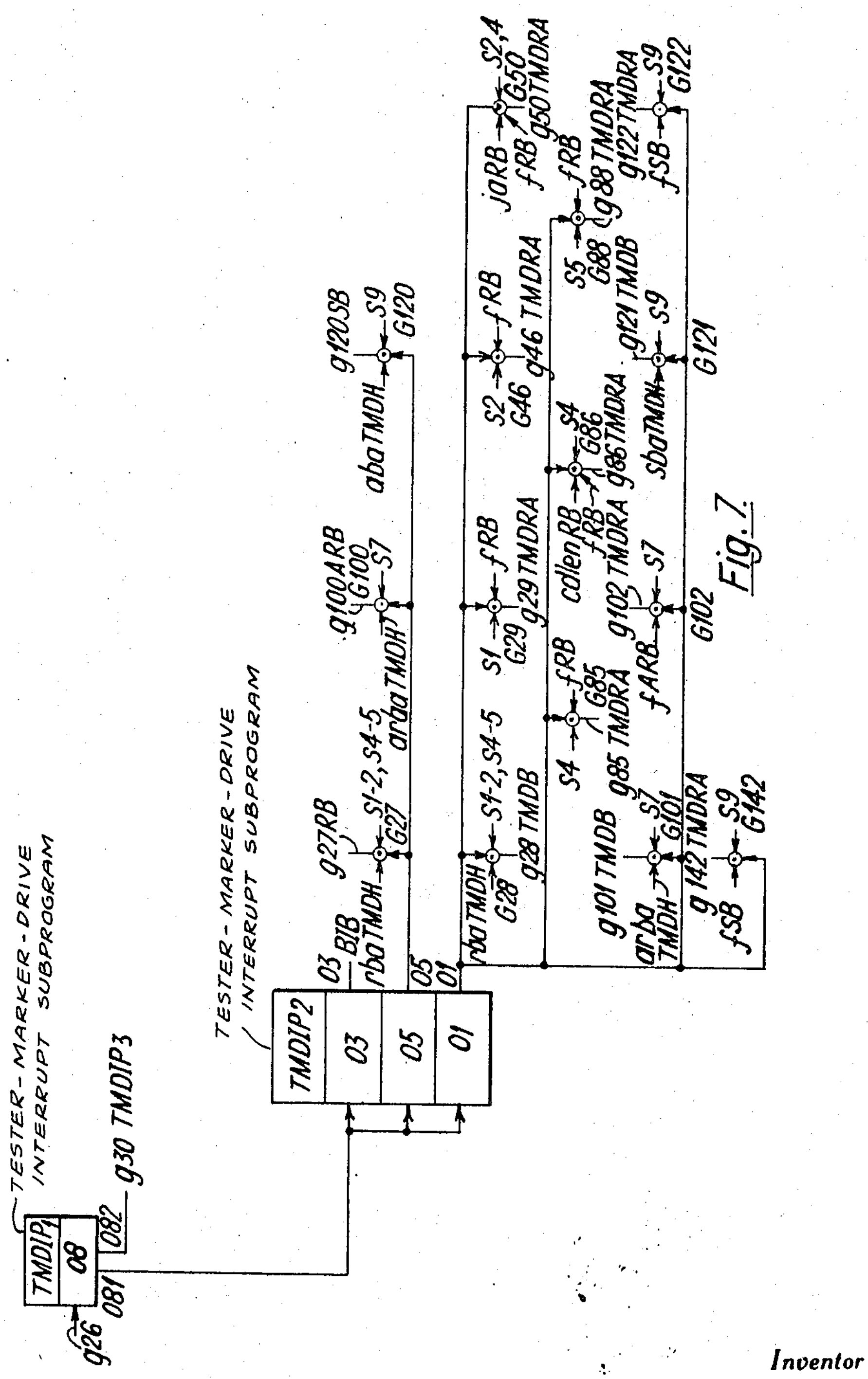
Figure 8:
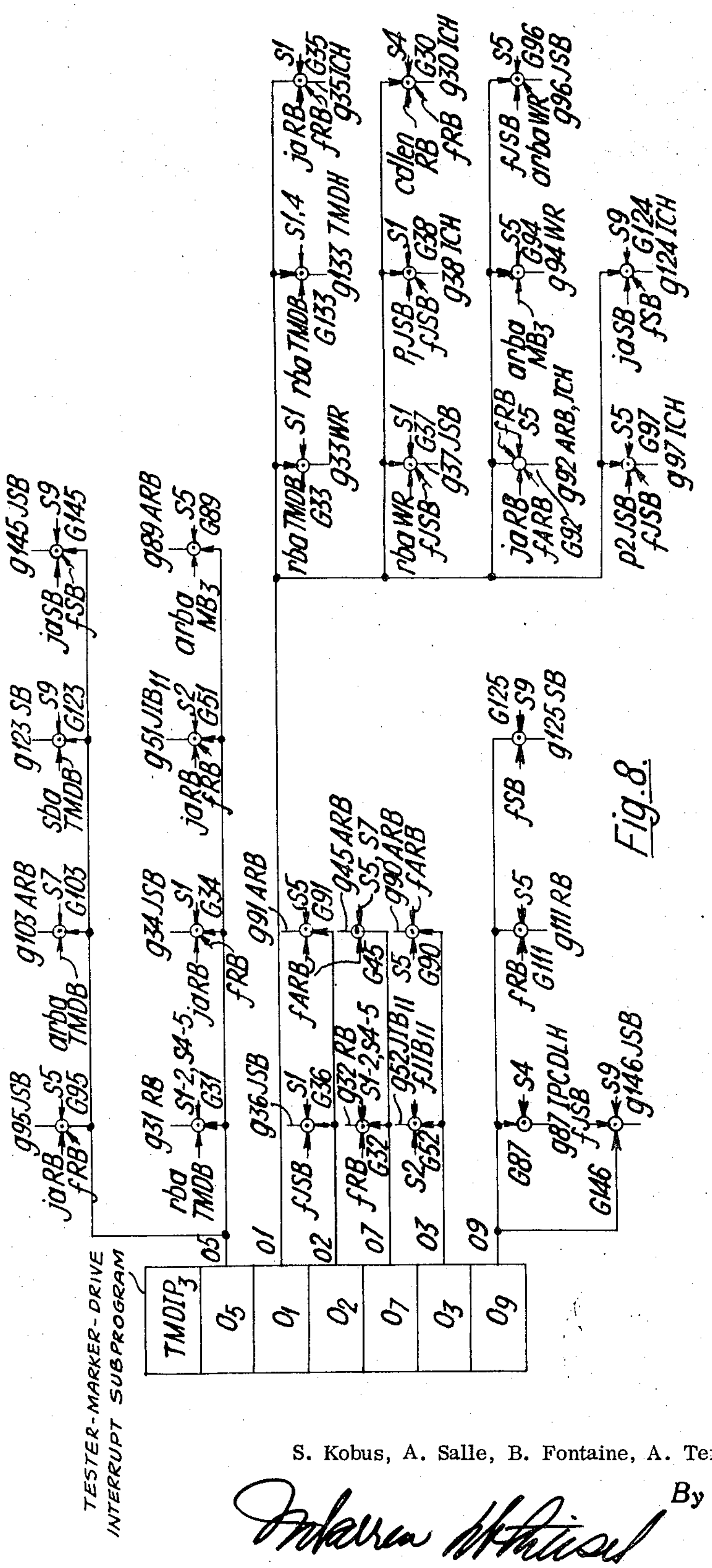
Figure 9:
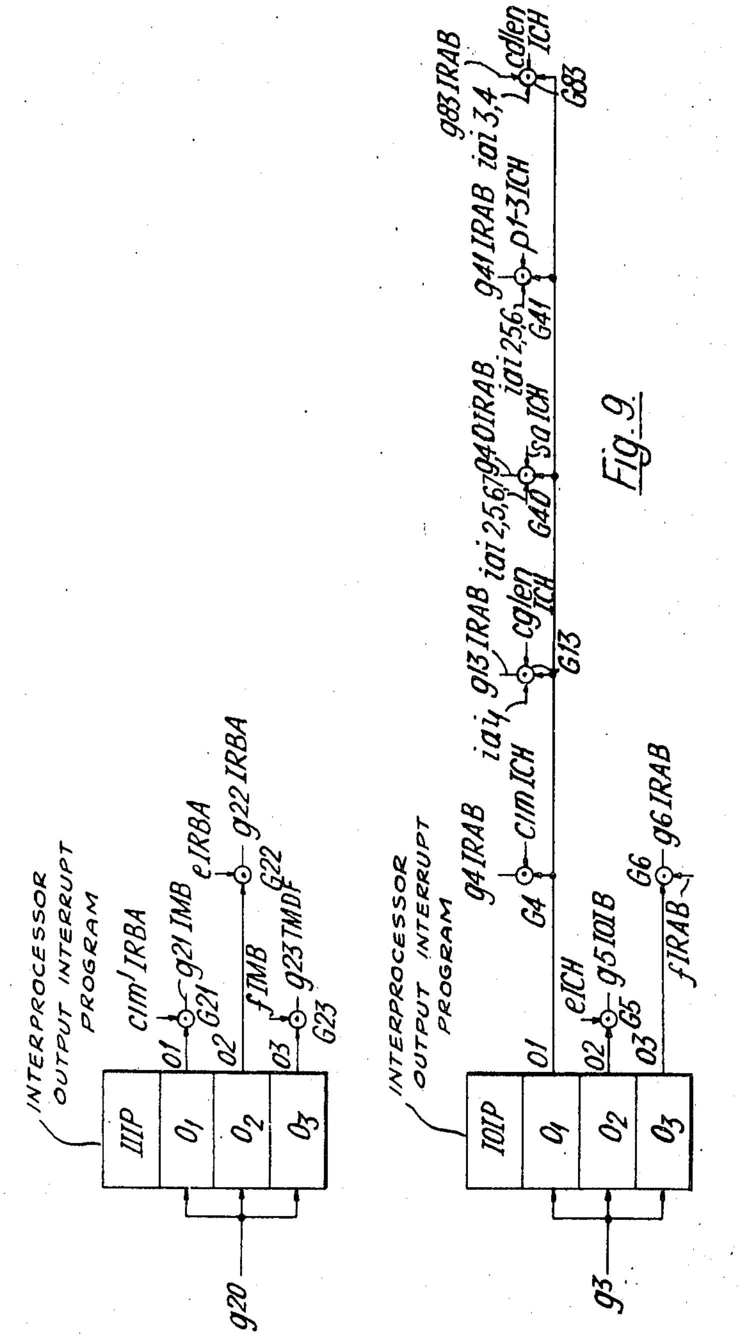
Figure 10:
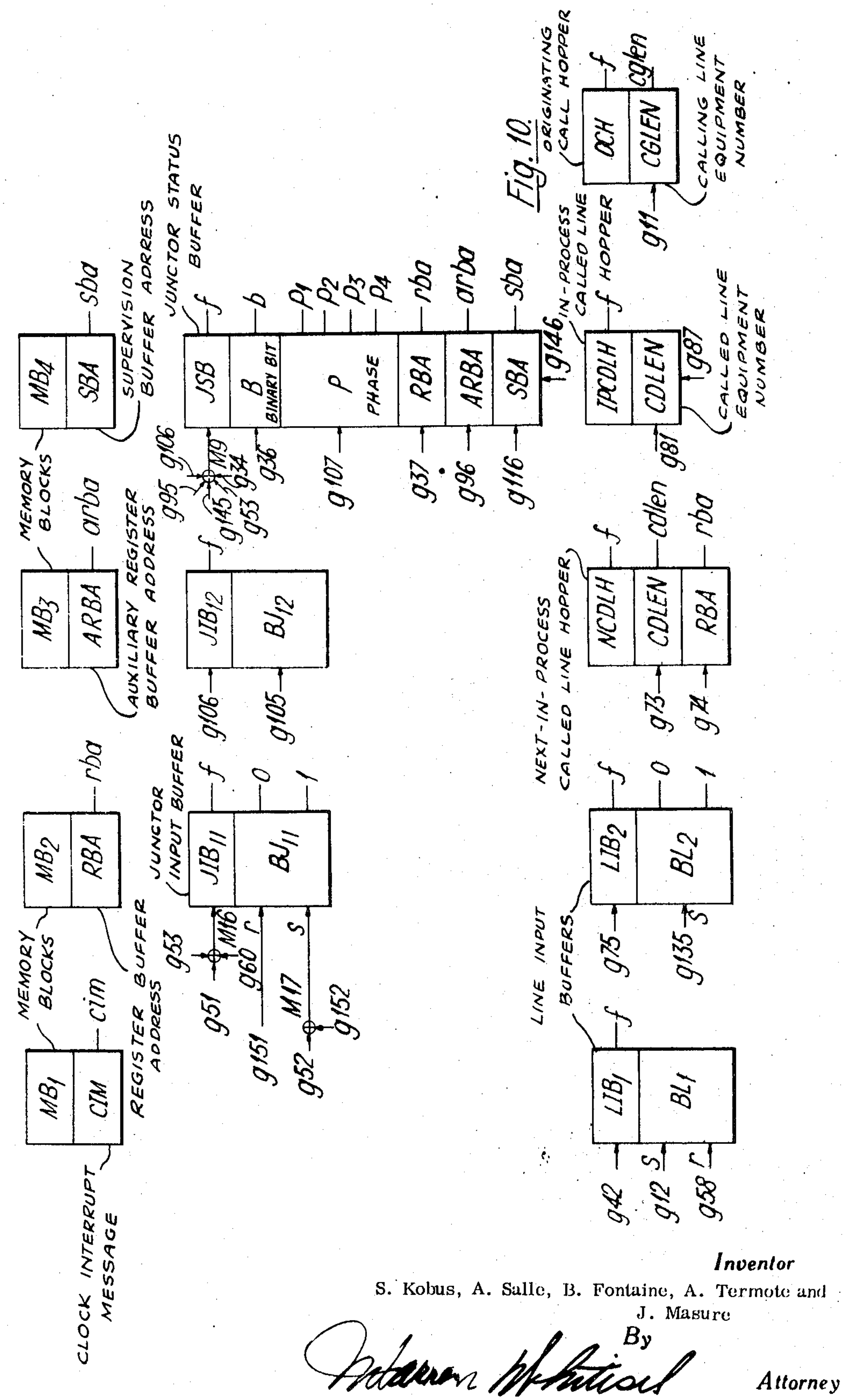
Figure 11:
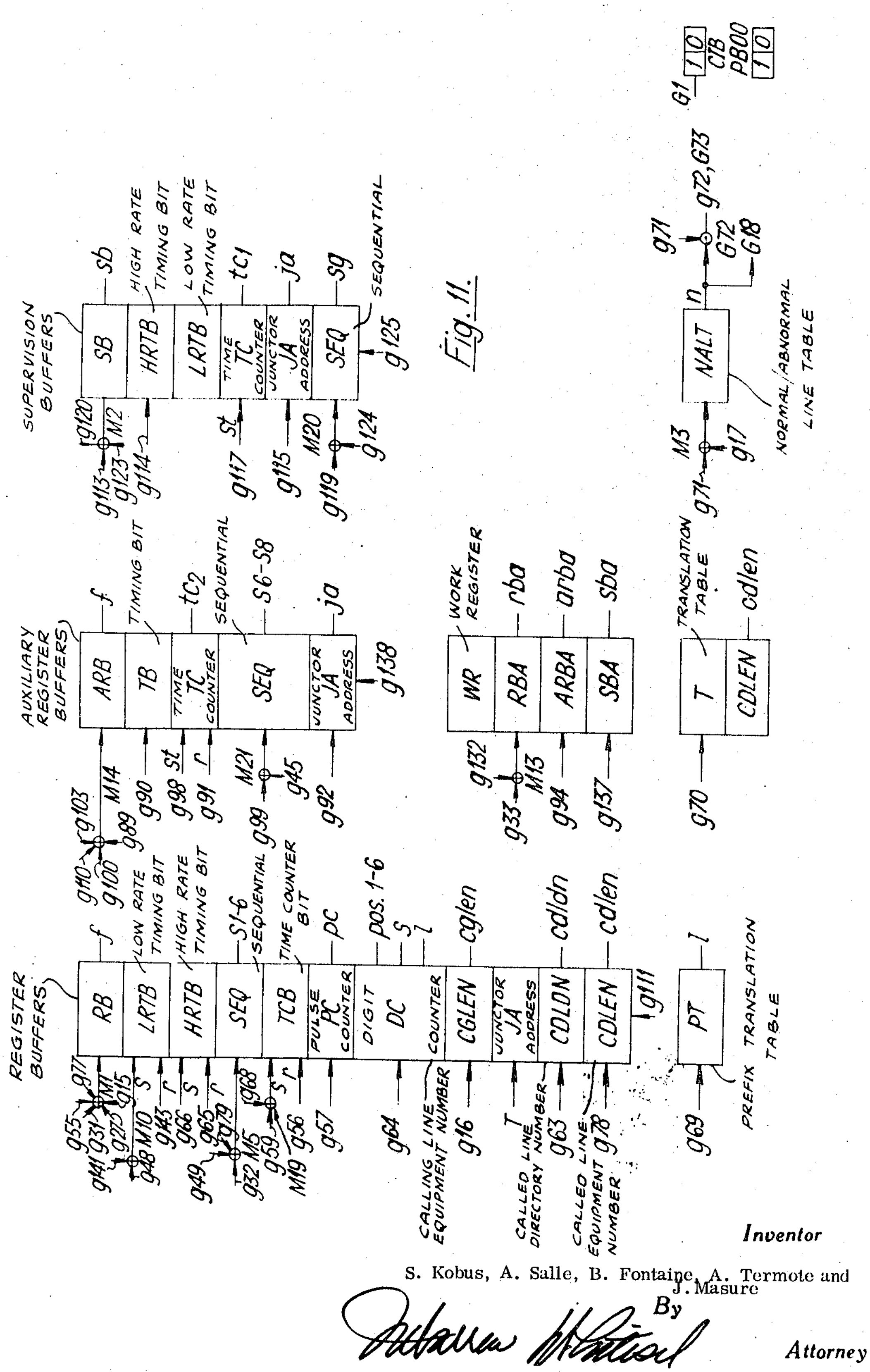
Figure 12:
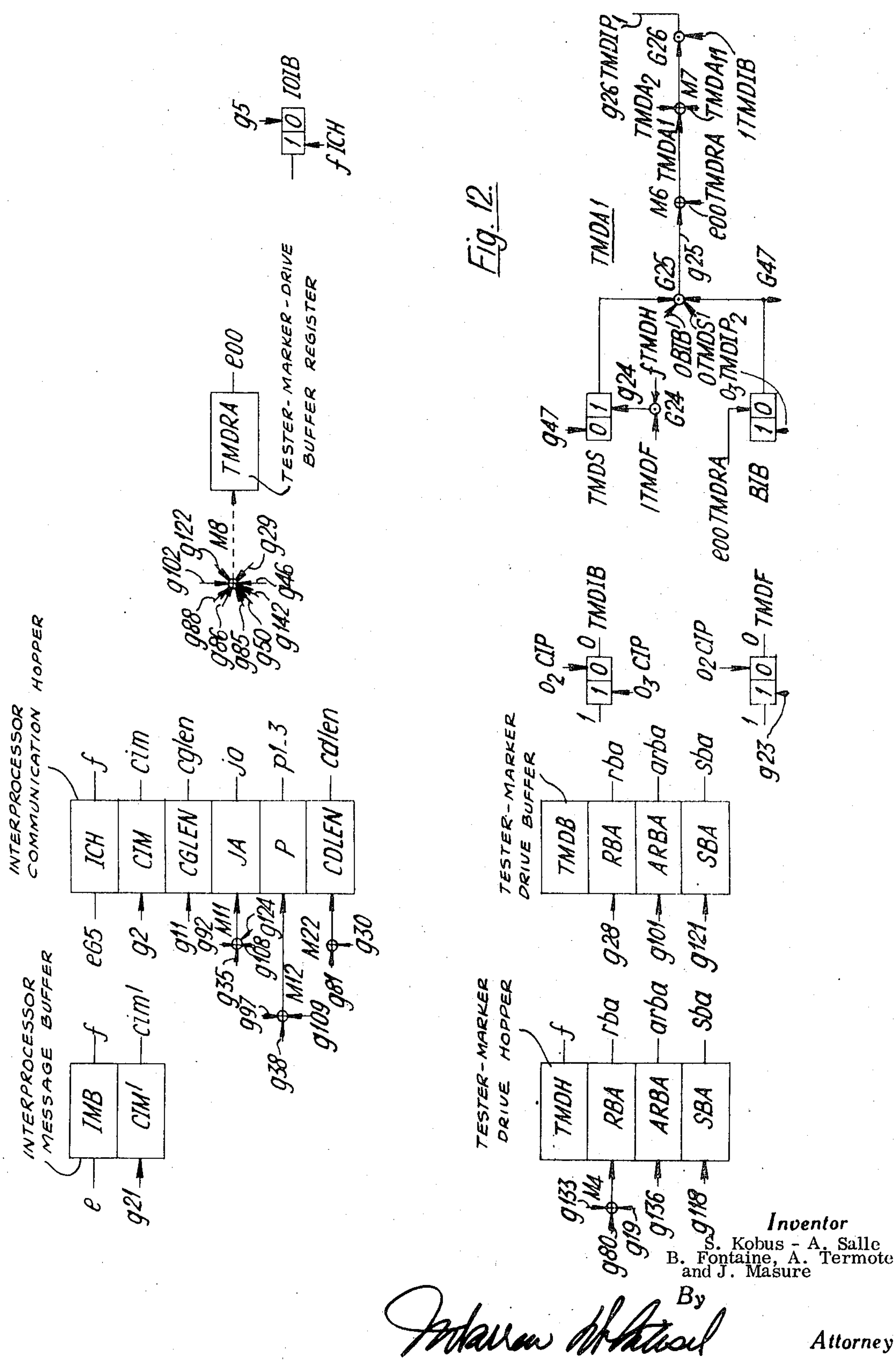
Figure 13:
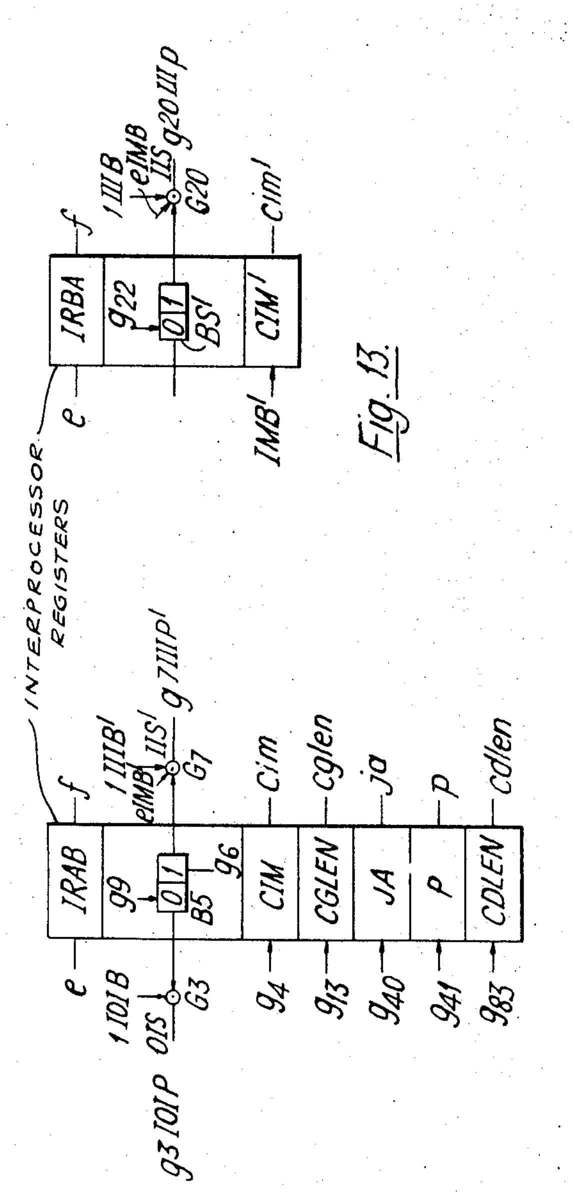
Figure 14:
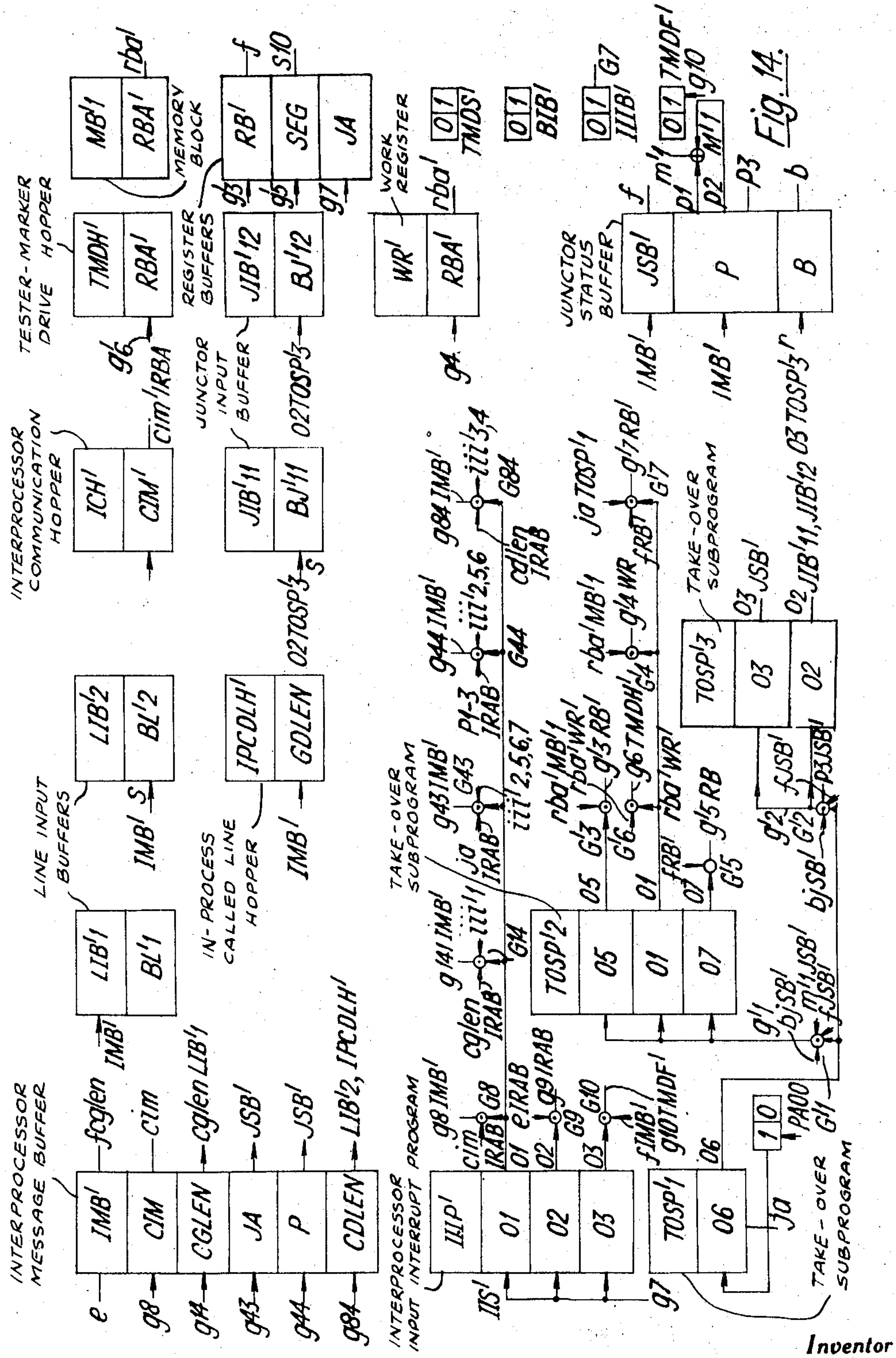

The above mentioned and other objects and features of the invention will become more apparent and the invention itself will be best understood by referring to the following description of an embodiment taken in conjunction with the accompanying drawings wherein:

FIG. 1 is a schematic diagram of an automatic telecommunication switching system and information handling system according to the invention;

FIGS. 2 to 6, arranged one below the other, schematically represent a clock interrupt program and a base level program of a central processor included in the system of FIG. 1;

FIGS. 7 and 8 schematically represent an asynchronous switching or tester marker driver interrupt program of this central processor;

FIG. 9 schematically represents interprocessor input and output interrupt programs of this central processor;

FIGS. 10 to 12 schematically represent elements included in the switching system of FIG. 1;

FIG. 13 shows in more detail the registers shown in FIG. 1;

FIG. 14 schematically represents interprocessor input and output interrupt and takeover programs of another central processor included in the system of FIG. 1, together with associated elements.

Principally referring to FIG. 1 the automatic telecommunication switching system shown includes two programmed processors and identical peripheral modules which comprise each a switching network part and two network control circuits each permanently connected to a respective one of the two programmed processors via transmission means. The programmed processors are identical and of equal status and are each capable of simultaneously and actively controlling the whole of the switching network constituted by the various switching network parts i.e. these processors operate on a load sharing basis. Each switching network part includes lines connected to subscriber stations, junctors, incoming trunks, outgoing trunks, etc., whereas each network control circuit includes line and junctor scanners, an asynchronous switching control circuit or tester marker driver (TMD) circuit, and a peripheral register having access on the one hand, to the scanners and, on the other hand, via a TDM register to the TMD circuit of the network control circuit of which it forms part. For instance the peripheral module PM1 comprises a switching network part SN1 and two network control circuits which includes the scanners SCA1, SCB1, and the TMD circuits TMDA1 and TMDB1. Likewise the peripheral module PM*n* comprises a switching network SN*n* and two network control circuits which include the scanners SCA*n*, SCB*n* and the TMD circuits TMDA*n* and TMDB*n*. The peripheral registers PRA1 to PRA*n* are connected via a transmission means or common bus bar BA to the programmed central processor CPA, whereas the peripheral registers PRB1 to PRB*n* are also connected via a common bus bar BB to the programmed central processor CPB. The TMD registers are not shown.

Each of these peripheral registers serves for storing information including orders which have been received from the associated central processor and which must be transmitted to the associated network control circuit in order that the latter should execute these orders and for storing information which has been received from this network control circuit and which must be transmitted to this processor in order to inform the latter. Hereby it should be noted that the intervention of a central processor is required when logical decisions must be taken since the network control circuits are not able to take such decisions but are only adapted to execute orders. More particularly the above scanners are used in a synchronous manner for executing orders in the associated switching network part, whereas the above TMD circuits are used in an asynchronous way for executing orders in the associated switching network part.

The above central programmed processors CPA and CPB are intercoupled via two unidirectional channels which include the output leads *a* and *b* and the two interprocessor registers IRAB and IRBA respectively, the former channel being used when information must be transmitted from processor CPA to processor CPB and the latter channel being used when information must be transmitted from processor CPB to processor CPA. Such a transmission of information is performed in order to inform a processor e.g. CPB about the state of the call connections handled by the other processor CPA in order that the processor CPB should not handle the same call connections and should be able to takeover the processing of the call connections handled by the processor CPA when the latter becomes faulty. It should however be noted that each processor is only informed of the characteristic phases of the handling of a call connection by the other processor as will be described in detail later. For instance, in case of a local call these characteristic phases are the following, it being supposed that the call connection is handled by processor CPA:

- a calling station or line has been detected. In this case the equipment number of this line is transmitted to processor CPB;
- a junctor has been connected to the calling line. In this case the identity of the junctor and the code indicative of this phase, i.e. the register phase, are transmitted to processor CPB;
- the called line identity has been received. The called line equipment number is then transmitted to processor CPB; ringing tone and current are sent to the interconnected subscribers. In this case a code indicative of this ringing or auxiliary register phase is transmitted to processor CPB;
- the call is in the conversation phase. The code indicative of this phase is then transmitted to processor CPB;
- the call connection has been released by releasing the junctor. In this case the junctor identity is transmitted to the processor CPB. The above output lead *a* of the CPA is further connected to the inputs *c* and *d* of a reversible counter RC and of a unidirectional counter CA respectively, whereas the output lead *b* of the CPB is further connected to the inputs *e* and *f* of the reversible counter RC and of a unidirectional counter CB respectively. These counters form part of a fault detection means arranged in control unit CU and are well known in the art and therefore not described in detail. For instance the reversible counter RC is of a type as described in U.S. Pat. No. 3,404,261 (P. J. JESPERS-P. T. CHU 1–4) and more particularly in FIG. 7 thereof.

The reversible counter is able to count a first predetermined value in each direction e.g. from −256 to +256, a 1 being added and subtracted when the inputs *c* and *e* are activated respectively. When this counter has counted the value +256 the output *g* is activated, whereas the output *h* is activated when the counter has counted the value −256. The unidirectional counters CA and CB are each able to count a second predetermined value which is larger than the first e.g. 1,024, a 1 being added each time their input *d* and *f* is activated respectively. When these counters have counted their maximum values their outputs *i* and *j* are activated respectively. The outputs *g* and *h* of the reversible counter RC are connected to the one-inputs of the bistate devices BSB and BSA, also forming part of the fault detection means, via the mixers MR1 and MR2 respectively, whereas the outputs *i* and *j* of the counters CA and CB are c are connected to the reset inputs *r* of all the counters via the mixer MR3. The one-outputs of the bistate devices BSB and BSA are connected to the one-inputs of the error indicating bistate devices PBOO and PAOO included in the CPA and the CPB respectively. The CPA further has an output *k* which is connected to the zero-inputs of the bistate devices BSA and PAOO and which is activated when the CPA operates correctly, whereas the CPB further has an output 1 which is connected to the zero-inputs of the bistate devices BSB and PBOO and which is activated when the CPB operates correctly.

As mentioned above, for each call connection handled by a processor, information is transmitted to the other processor a number of times so that the number of transmissions originated by a processor is proportional to the number of call connections handled by this processor. Since each processor has access to the whole of the switching network via the associated network control circuits, it is clear that each such processor will normally handle about half of the total number of call connections i.e. these processors operate on a load-sharing basis. Hence the number of transmissions originated by the processors CPA and CPB will approximately be the same when both these processors operate correctly, but will considerably differ when one of these processors is faulty, the processor originating the smaller number of transmissions being the faulty one, when the difference between these numbers reaches a predetermined value for a given maximum value of these numbers. It is indeed clear that there will nearly always exist a difference due to the traffic handled by both processors being not completely equal and it is supposed that only when a processor is faulty the above difference can reach 25 percent, or 256, of a given maximum value of 1,024 transmissions from CPA to CPB or vice versa. This is the reason why the reversible counter RC of 256 and the unidirectional counters of 1,024 are provided.

The above described system operates as follows: each time a transmission of information from the CPA to the CPB and vice versa is executed the outputs *a* and *b* are activated respectively and the reversible counter RC and the unidirectional counters CA and CB are stepped respectively. When either one of the latter counters CA or CB has counted 1,024 all the counters are reset via the mixer MR3. When a processor, e.g. CPA is faulty the output *a* is activated a much smaller number of times than the output *b* or is even not at all activated so that the reversible counter will at a certain moment attain its minimum value −256. Consequently the output *h* is activated and the bistate device BSA is triggered to its one-condition via the mixer MR2 thus indicating that the processor CPA is faulty. In order to inform the processor CPB about this faulty condition the bistate device PAOO is set to its one-condition via the activated one-output of the bistate device BSA. When during a base level maintenance program in the CPB the PAOO is found in its set condition a so-called takeover program is started due to which the processor CPB continues the handling of the call connections handled by the processor CPA. More particularly the calls which are in the register phase are released, whereas the calls which are in the conversation phase are handled further, as will be described later. In an analogous manner the bistate devices BSB and PBOO are set when the processor CPB is found to be faulty.

A faulty processor may also be detected, instead of in the statistical manner described above, by the above maintenance program and when such a processor is detected the associated output *m* or *n* is activated so that the associated bistate devices BSA (via mixer MR2) and PAOO or BSB (via mixer MR1) and PBOO are set. By this maintenance program also the condition of the various network control circuits is checked and when such a control circuit is found to be faulty the error indicating bistate device PAOO or PBOO of the corresponding processor is also set.

When a processor has been repaired the associated output *k* or *l* is activated due to which the associated bistate devices BSA, PAOO and BSB, PBOO are reset.

Instead of using the above described fault detection means including counters and arranged in a separate control unit, one could also use in each processor a first accumulator adapted to count the difference between the transmissions originated and received, i.e. between the numbers of calls treated by the two processors, and a second accumulator adapted to count the number of transmissions originated or received, i.e. the number of calls treated, by one of the two processors. When the first accumulator has then reached a first, or a second predetermined value, when the second accumulator has not exceeded a third predetermined value it is indicated that the one or other processor is faulty. Indeed when it is supposed that the first accumulator is adapted to count from −256 to +256, whereas the second accumulator is adapted to count 1,024 and that a 1 is added to both the accumulators when a transmission is originated, whereas a 1 is subtracted from the first accumulator when a transmission is received, the first accumulator in position +256 indicates that the other processor is faulty, whereas in position −256 it indicates that it is faulty itself. Hereby it is supposed that the second accumulator has not yet counted 1,024 in which case the first accumulator is reset.

Hereinafter the control by processor CPA of a local call connection will be described in detail. Such a local call connection is realized between a calling and a called station and through a junctor and other switching means of the switching network. This call connection control operation includes a register and auxiliary register phase during which the connection is established and ringing is performed, a conversation phase during which the connection is maintained and a release phase during which the connection is released by releasing the junctor. But before describing in detail the control of this local call connection reference is made to FIGS. 10 to 14.

The processor CPA includes a central memory which comprises the following words the aim of which will become clear later. Hereby it should be noted that buffers store variable data in addresses rigidly associated with devices, that hoppers store variable data in a queue and that tables store constant or semipermanent data:

a plurality of memory blocks MB1 to MB4 (FIG. 10) for storing a clock interrupt message CIM and the addresses RBA, ARBA and SBA of at least one free register buffer to be used in the register phase of a call connection, of at least a free auxiliary register buffer to be used in the ringing phase of a call connection and of at least a free supervision buffer to be used in the release phase of a call connection;

a work register WR (FIG. 11) for temporarily storing a register buffer address RBA, an auxiliary register buffer address ARBA or a supervision buffer address SBA;

a plurality of first information words or junctor status buffers, such as JSB (FIG. 10), each permanently associated to a junctor and used for storing a binary bit B indicating by what processor the call connection involving this junctor is handled, a 3 bits binary code indicative of one of the above phases P of this call connection, and the address RBA of a register buffer ARBA of an auxiliary register buffer or SBA of a supervision buffer involved in this call connection;

a plurality of second information words or line input buffers, such as LIB1 and LIB2 (FIG. 10) each permanently associated to a line or station and used for storing a binary bit BL1, BL2 simultaneously characterizing the condition of the line loop and of the classical cutoff relay;

a plurality of third information words or junctor input buffers, such as JIB11 and JIB12 (FIG. 10) each permanently associated to an input of a junctor and used for storing a binary bit such as BJ11, BJ12 characterizing the condition or state of the loop between the associated junctor input, such as JI11, JI12, and a station or line involved in a call connection;

a plurality of register buffers, such as RB (FIG. 11), storing a low rate timing bit LRTB, a high rate timing bit HRTB, a sequential SEQ, a time counter bit TCB, a pulse counter PC, a digit counter DC and further capable of storing a calling line equipment number CGLEN, a junctor address JA, a called line directory number CDLDN or a called line equipment number CDLEN;

a plurality of auxiliary register buffers, such as ARB (FIG. 11) storing a timing bit TB, a time counter TC, a sequential SEQ and capable of storing a junctor address JA;

a plurality supervision buffers, such as SB (FIG. 11), storing a high rate timing bit HRTB, a low rate timing bit LRTB, a time counter TC, a sequential SEQ and a phase P and capable of storing a junctor address JA;

an interprocessor message buffer IMB (FIG. 12) for storing information, such as a clock interrupt message CIM′ transmitted to the CPA by the CPB;

a TMD buffer TMDB (FIG. 12) for storing the address RBA of a register buffer, ARBA of an auxiliary register, or SBA of a supervision buffer SBA involved in the handling of a call;

an originating call hopper OCH (FIG. 10) for storing equipment numbers such as CGLEN of calling stations or lines;

a next in process called line hopper NCDLH (FIG. 10) for storing equipment numbers such as CDLEN of stations or lines which have just been called for, and register buffer addresses such as RBA;

an in process called line hopper IPCDLH (FIG. 10) for storing equipment numbers such as CDLEN of called stations or line;

an interprocessor communication hopper ICH (FIG. 12) for storing information to be transmitted from the CPA to the CPB. This information may comprise a clock interrupt message CIM, and for each call, a calling line equipment number CGLEN, a junctor address JA, a phase P and a called line equipment number CDLEN;

a TMD hopper TMDH (FIG. 12) for storing for each call the address RBA of a register buffer, ARBA of an auxiliary register, or SBA of a supervision buffer;

a plurality of TMD flags TMDF (FIG. 12) each associated to a TMD circuit and constituted by a single memory bit represented as a bistate device. The TMDF shown is associated to the TMDA1 of PM1 (FIG. 1).

The processor CPA further includes:

the above mentioned error indicating bistate device PBOO (FIG. 11);

a prefix translation table PT (FIG. 11);

a translation table T (FIG. 11) for translating a called line directory number such as CDLDN in a called line equipment number such as CDLEN;

a normal/abnormal line table NALT (FIG. 11) for checking if calling and called line equipment numbers belong to a normal or to an abnormal station or line;

TMD seizure bistate devices TMDS (FIG. 12) each associated to a TMD circuit e.g. to the TMDA1 of PM1;

TMD busy/idle bistate devices BIB each associated to a TMD circuit e.g. TMDA1;

a TMD buffer register TMDRA which is the register arranged between each TMD circuit e.g. TMDA1, and the associated peripheral register e.g. PRA1, as mentioned in relation with FIG. 1.

a clock interrupt bistate device CIB (FIG. 11) permitting (one-condition) or preventing (zero-condition) a so called clock interrupt program to take place in the processor;

an interprocessor output interrupt bistate device IOIB (FIG. 12) permitting (one-condition) or preventing (zero-condition) a so called interprocessor output interrupt program to take place in the processor;

an interprocessor input interrupt bistate device IIIB (not shown) permitting (one-condidition) or preventing (zero-condition) a so called interprocessor input interrupt program to take place;

a TMD interrupt bistate device TMDIB (FIG. 12) which is common to all the TMD circuits and which permits (one-condition) or prevents (zero-condition) a so called asynchronous switching or TMD interrupt program to take place.

The processor CPB includes the same devices as mentioned above for processor CPA. Some of these devices are represented on FIG. 14 and are indicated by the same references provided with an accent, except PAOO the homologue of which is PBOO.

The interprocessor register IRAB (FIG. 13) already shown in FIG. 1 includes a bistate device BS and is adapted to store a clock interrupt message CIM, a calling line equipment number CGLEN, a junctor address JA, a phase P and a called line equipment number CDLEN. The IRBA is adapted to store analogous information.

Each of the processors CPA and CPB is able to execute the following main programs classified in a decreasing order of priority: an interprocessor output interrupt program, an interprocessor input interrupt program, a clock interrupt program, an asynchronous switching or TMD interrupt program and a base level program. By this priority is meant that any of these programs may be interrupted by all those having a higher priority, interrupt sources being provided for provoking such an interrupt.

The base level program consists in the control of the execution of deferrable operations and for instance in case of a local call the base level program BLP in the CPA comprises the following subprograms: the examination at a high rate, i.e. every 154 milliseconds, of the register buffers, the auxiliary register buffers, the supervision buffers and the originating call hopper OCH; the examination at a low rate of the register buffers (every 15 seconds), of the supervision buffers (every 2 minutes) and finally a maintenance program including the examination of various test points in the network and of the bistate device PBOO for controlling the correct operation of the processor CPB.

An interprocessor output interrupt program IOIP in the CPA mainly consists in controlling the transmission of information from the ICH of the CPA to the IRAB.

An interprocessor input interrupt program IIIP in the CPA mainly consists in controlling the transmission of information from the IRBA to the IMB of the CPA.

A clock interrupt program CIP in the CPA is started every 14 milliseconds and controls the following successive operations: comparison of the previous and present states of the first junctor inputs, of the second junctor inputs and of the line inputs and examination of the NCDLH.

A TMD interrupt program TMDIP1, 2 in the CPA controls the transmission of information including orders from the CPA to a TMD circuit whereas a TMD interrupt program TMDIP1,3 controls the transmission of information from a TMD circuit to the CPA. In case of a local call the following orders received from the CPA together with information are executed in succession by a TMD circuit:

search for a free junctor and connect it to the calling line;

connect a feeding bridge in the junctor and send dial tone;

connect a junctor to the called line;

send continuous ringing tone and current to the calling and called subscribers;

stop the continuous ringing operation and start the interrupted ringing operation;

release the connection between the calling and called subscribers.

From the above it also follows that in processor CPA the base level program controls operations within the processor and the switching network, that the clock interrupt program controls synchronous operations involving the processor and the switching network, that the TMD interrupt programs control the asynchronous operations involving the processor and the switching network and that finally interprocessor interrupt programs control operations involving the two processors.

The programs in the CPB are completely analogous to those briefly described above for the CPA, but the clock interrupt programs are shifted by 7 milliseconds with respect to those in the CPA. Due to this time shift it is ensured that the above clock interrupt programs of the CPA and the CPB never simultaneously control operations involving same parts of the switching network.

In order to prevent TMD interrupt programs of the processors CPA and CPB from simultaneously controlling TMD operations involving same parts of the switching network, such TMD operations may only take place when a plurality of conditions are simultaneously fulfilled, as will be explained in detail later.

Principally referring to the FIGS. 2 to 14 the control of a local call connection by processor CPA is described hereinafter. Since the following operations are known per se in processing technique they are not detailed:

01 : read and transfer;
02 : reset;
03 : set;
04 : update;
05 : read and find;
06 : interrogate, read or examine;
07 : step;
08 : scan and select; and
09 : erase.

For simplification purposes it is supposed that the processors and the switching network are in their rest position at the moment the local call is made and that the call connection is established through the switching network part included in the peripheral module PM1.

At the start of a clock interrupt program in processor CPA, this program being executed every 14 milliseconds, a clock CL delivers an output signal which activates one input of a coincidence gate G1 (FIG. 2) the other input which is connected to the one-output of the above mentioned clock interrupt bistate device CIB (FIG. 11) which is normally in its set or one-condition but which may be brought in its reset or zero-condition when an interrupt signal of an interrupt source associated to a program having a higher priority than the clock interrupt program is operated in the central processor CPA. It being supposed that the clock interrupt bistate device CIB is in its set condition, the output of the coincidence gate G1 which constitutes the clock program interrupt source is activated so that the resultant clock program interrupt signal CIS starts a clock interrupt program CIP (FIGS. 2, 3, 4) which comprises the following successive operations, only the TMD circuit TMDA1 of the PM1 being considered:

resetting (FIG. 12) of the TMD interrupt bistate device TMDIB which is common to TMDA1 to TMDA$n$, of the TMD flag TMDF included in the TMDA1, and of the TMD seizure bistate device TMDS included in the TMDA1 via the coincidence gate G47 when the TMD busy/idle bistate BIB included in the TMDA1 is in its zero-condition, as is supposed. The output lead $g47$ of the gate G47 is activated in this case. This operation is controlled by the order 02 represented by a block connected to the zero-inputs of the TMDF and of the TMDIB and to the zero-input of the TMDS via the gate G47 which is conditioned by the zero-input of the BIB. The aim of the TMDIB when reset is to prevent a TMD interrupt program from taking place in the processor during a program of higher priority i.e. for instance during the clock interrupt program which has just started. The TMDF when reset prevents the TMDS from being set during the first half period of 7 milliseconds of the time interval of 14 milliseconds which has just started and which elapses between two successive clock interrupts. Indeed, as will be explained later, the setting of the TMDS is only possible when information must be transmitted to the associated TMD circuit TMDA1 and when simultaneously the TMDF is in its set or one-condition (see gate G24 on FIG. 12) and this is only the case during the second half period of the above time interval. Finally, the aim of the above mentioned gate G47 is to prevent the TMDS to be reset when the TMD circuit TMDA1 is still busy, this being indicated by the BIB being in its set condition. This is necessary since it may happen that a TMD circuit has not finished its operation at the end of a 7 milliseconds second half period of a time interval of 14 milliseconds, in which case it must obviously be able to continue this operation during the second half period of the following 14 milliseconds time interval.

reading of a clock interrupt message CIM, indicating the start of the clock interrupt program, in the memory block MB1 (FIG. 10) of the central memory and transfer of this message to the interprocessor communication hopper ICH (FIG. 12). This read and transfer operation is controlled by the order 01 and is schematically represented by the coincidence gate $g2$ the inputs of which are connected to the outputs 01 of the CIP and *cim* of the MB1 and the output $g2$ of which is connected to the case CIM of the ICH. When the CIM has been registered in the ICH, and in general when information is stored therein, this is schematically represented by the output $f$ thereof being activated. The output $f$ being activated the interprocessor output interrupt bistate device IOIB (FIG. 12) is set to its one-condition thus permitting an interprocessor output interrupt program to take place. When the interprocessor register IRAB (FIG. 13) is free, its busy/idle bistate device BS is in its reset or zero-condition, whereas this BS is in its set condition when the IRAB is busy. Assuming BS to be in its reset condition and due to the IOIB being in its set condition, the output $g3$ of the coincidence gate G3 (FIG. 13) which constitutes the interprocessor output interrupt program source is activated so that the resultant output interrupt signal OIS interrupts the clock interrupt program CIP and starts an interprocessor output interrupt program IOIP (FIG. 9).

It should be noted that the program taking place is interrupted in a standard manner and that the information gathered is temporarily stored in order to be able to continue the interrupted program when the interrupting program is finished. Also, programs of lower priority are prevented from being executed (IIIB and CIB are reset) whereas programs of higher priority, if any, may be executed. This is not described in detail since it is well known, e.g. from the above Bell System Technical Journal and since it does not form part of the invention.

The above IOIP comprises the following operations:

reading of the CIM in the ICH (FIG. 12) and transfer of this information to the interprocessor register IRAB (FIG. 13). This read and transfer operation is controlled by the read and transfer order 01 and is schematically represented by the coincidence gate G4 (FIG. 9) the inputs of which are connected to the outputs 01 of the IOIP and *cim* of the ICH and the output $g4$ of which is connected to the case CIM of the interprocessor register IRAB;

resetting of the interprocessor output interrupt bistable IOIB (FIG. 12) when the CIM has been transferred from ICH thus preventing an interprocessor output interrupt program from taking place. This operation is controlled by the reset order 02 and is schematically represented by the coincidence gate G5 the inputs of which are connected to the outputs 02 of the IOIP and the schematic output $e$ of the ICH this output being activated when the CIM has left the ICH. The output $g5$ of the gate G5 is connected to the zero-input of the IOIB;

setting of the busy/idle bistate device BS of the IRAB (FIG. 13) when information has been inscribed therein, thus preventing other information from being transferred to this register IRAB. This operation is controlled by the order 03 and is schematically represented by the coincidence gate G6 the inputs of which are connected to the outputs 03 of the IOIP and $f$ of the IRAB, the latter output in the activated condition schematically indicating that information has been described in the IRAB. The output $g6$ of the gate G6 is connected to the one-input of the busy/idle bistate device BS.

The interrupted clock interrupt program CIP is then continued with the subprogram SP1 (FIG. 2) which mainly consists in the comparison of the previous and present states of the first inputs of the junctors as will be described later.

But meanwhile the following happens. When the interprocessor interrupt bistate device IIIB′ (FIG. 14) of processor CPB is in its one-condition as is supposed, due to no program of higher priority taking place whereas the interprocessor message buffer IMB′ is idle (output $e$ activated), and since moreover the busy/idle bistate device BS of the IRAB is also in its one-condition the output $g7$ of the coincidence gate G7 (FIG. 13) which constitutes the interprocessor input interrupt program source of the CPB is activated so that the resultant input interrupt signal IIS′ interrupts the program taking place in the processor CPB if the latter program is not of a higher priority, as is supposed, and starts an interprocessor input interrupt program IIIP′ (FIG. 14) which comprises the following operations:

reading of the clock interrupt message CIM in the interprocessor register IRAB and transfer of this information to the interprocessor message buffer IMB′ (FIG. 14) of processor CPB in order to inform the latter about the start of a clock interrupt program in the CPA. This read and transfer operation is controlled by the read and transfer order 01 and is schematically represented by the coincidence gate G8 (FIG. 14) the inputs of which are connected to the outputs 01 of the IIIP′ and *cim* of the IRAB and the output $g8$ of which is connected to the case CIM of the interprocessor message buffer IMB′ (FIG. 14);

resetting of the interprocessor register busy/idle bistate device BS (FIG. 13) when the CIM has been transferred from the IRAB, thus again enabling the transfer of information to this IRAB. This operation is controlled by the reset order 02 and by the schematic output lead $e$ of the register IRAB, this output lead $e$ being activated when the latter register IRAB becomes empty and is schematically represented by the coincidence gate G9 the inputs of which are connected to the outputs 02 of the IIIP' and *e* of the IRAB and the output *g*9 of which is connected to the zero-input of the IRAB busy/idle bistate device BS;

setting of the TMD flag TMDF' of processor CPB when the clock interrupt message CIM has been received in the IMB' i.e. when the latter is full (output *f* activated). This operation is controlled by the set order 03 and is schematically represented by the coincidence gate G10 the inputs of which are connected to the outputs 03 of the IIIP' and *f* of the IMB' and the output *g*10 of which is connected to the set input of the TMDF' (FIG. 14). It should be noted that this set operation is executed substantially 7 milliseconds after the start of a CIP in the CPB. Due to the TMDF' being in its set condition it does not prevent the TMDS' in the CPB from being set.

After the above described interprocessor output interrupt program has been finished the clock interrupt program CIP in the CPA is continued by the execution of the following successive subprograms.

simultaneous scanning of the first inputs of the junctors such as JI11 of JI1 in order to know the present states of the loops including these inputs and calling stations, and of the corresponding junctor input buffers, such as JIB11, in order to know the previous state of the loops including these inputs and calling stations, and comparison of these states. This subprogram is represented by a block indicated by SP1 (FIG. 2) and will not be described in detail. This block has two outputs leads 1*o* and 1*c* which are activated when an opening and a closure of a loop including a first junctor input are detected respectively. Such a junctor loop opening is characterized by a previous state 1 (loop closed) and a present state 0 (loop open), whereas a junctor loop closure is characterized by a previous state 0 and a present state 1. It is supposed that none of these outputs is activated so that the next subprogram is started;

simultaneous scanning of the second inputs of the junctors, such as JI12 of JI1, and of the corresponding junctor input buffers, such as JIB12, and comparison of the scanned states. This subprogram is represented by a block indicated by SP2 (FIG. 3) and having two output leads 1*o* and 1*c* which are activated when an opening and a closure of a loop including a second junctor inlet in a called station are detected respectively. It is supposed that none of these outputs is activated so that the next subprogram is started. It should be noted that during a CIP not all the JI12 and JIB12 are scanned but only a part of them in such a manner that each JI12 and JIB12 is scanned every 154 milliseconds for instance. During a CIP only an eleventh part of the total number of JI12 and JIB12 are scanned since a CIP is executed every 14 milliseconds.

simultaneous scanning of the line inputs LI and of the line bits such as BL1, BL2 in the corresponding line input buffers, such as LIB1, LIB2 and comparison of the scanned states. This subprogram is represented by a block indicated by SP3 (FIG. 3) and having two outputs 0/1 and 1/0 which are activated when a 0/1 mismatch and a 1/0 mismatch are detected respectively between the present and previous conditions of a line bit. It should be noted that the line bit indicates the condition of the output of an OR-gate itself conditioned by the line loop condition and by the condition of the cutoff relay.

When the output 1/0 of SP3 is activated upon scanning a line due to the subscriber connected to this line having lifted his telephone from the cradle in order to make a local call. The resultant signal starts the execution of the subprogram SP4 which comprises the following operations:

reading of the calling line equipment number CGLEN provided by the SP3 (output *cglen*) and transfer of this information to the originating call hopper OCH (FIG. 10) thus indicating that a call has been detected and that a register must be seized and to the interprocessor communication hopper ICH (FIG. 12) thus indicating that this CGLEN must be transferred to the CPB. This operation is controlled by the order 01 and is schematically represented by the coincidence gate G11 the inputs of which are connected to the output 01 of the SP4 and CGLEN of the SP3 and the output *g*11 of which is connected to the cases CGLEN of the OCH and of the ICH.

setting of the line bit BL1 in the line input buffer LIB1 (FIG. 10) of the calling line thus making this line busy in the memory. This operation is controlled by the order 03 and is schematically represented by the coincidence gate G12, the inputs of which are connected to the outputs 03 of the SP4 and *f* of the LIB1 and the output *g*12 of which is connected to the set inputs of the case BL1 of the LIB1. The output *f* of the LIB1 should be activated when the LIB1 is being examined.

Due to the interprocessor communication hopper ICH (FIG. 12) containing information its schematic output lead *f* should be activated so that the interprocessor output interrupt bistate device IOIB (FIG. 12) is set to its one-condition. When the bistate device BS of the IRAB (FIG. 13) is in its zero-condition the output *g*3 of the coincidence gate G3 (FIG. 13) is activated, so that the resultant output interrupt signal OIS interrupts the clock interrupt program CIP and starts an interprocessor output interrupt program IOIP (FIG. 9). This IOIP is hence executed for the first time for the call connection handled. In an analogous manner as described above for the CIM, the calling line equipment number CGLEN is transferred from the ICH to the IRAB via the coincidence gate G13 (FIG. 9), the inputs of which are connected to the outputs 01 of the IOIP, cglen of the ICH and *ioi*1 and the output *g*13 of which is connected to the case CGLEN of the IRAB (FIG. 13). Afterwards the bistate device IOIB is reset via the coincidence gate G5, whereas the bistate device BS of the IRAB is set via the coincidence gate G6. It should be noted that the input *ioi*1 of the gate G13 indicates that this gate is involved in the first execution of the interprocessor input interrupt program in the CPA for the call described and that the CGCLEN is accompanied by an order indicating that the line input buffer corresponding to the identity tCGLEN must first be found in the CPB by means of this identity and that afterwards the line bit must CGLEN set in this line input buffer.

When this interprocessor output interrupt program IOIP is finished the interrupted clock interrupt program CIP is continued, but meanwhile an interprocessor input interrupt program IIIP' (FIG. 14) is started in the processor CPB if all the above mentioned conditions for producing and interprocessor input interrupt signal IIS' are fulfilled, as is supposed. During this program first the calling line equipment number CGLEN is transferred from the IRAB to the interprocessor message buffer IMB' of the CPB via the coincidence gate G14 the inputs of which are connected to the outputs 01 of the IIIP', *cglen* of the IRAB and *iii'*1 and afterwards the bistate device BS of the IRAB is reset. Again the input *iii'*1 of the gate G14 indicates that this gate is involved in the first execution of the IIIP' in the CPB for the call described and that the CGLEN is accompanied by the above order indicating that the line bit of the line input buffer corresponding to the CGLEN must be set in the CPB.

In general each gate directly involved in the transfer of information from one processor to another will be provided with a schematic input indicating the number of the transfer for the call handled in which it is involved. This schematic input also represents the order to be executed by means of the information transmitted. Therefore this will not be repeated in the following description.

In the central processor CPB the calling line equipment number CGLEN is used to find the corresponding line input buffer LIB'1 (FIG. 14) and to update this buffer by setting the bit Bl'1 to 1 indicating that the line loop of this line has been closed i.e. that this line is in the calling condition. These operations are not shown in detail but only represented by the output *cglen* of the IMB' being connected to the LIB'1. It should be noted that due to the bit BL'1 being set in the line input buffer LIB'1 the corresponding line is busied in the central memory of the CPB of which this line input buffer forms part. In this manner, when the CPB executes the subprogram SP'3 corresponding to SP3 in the CPA, no mismatch will be detected between the conditions of the line loop which is indeed closed and the bit BL'1 which is indeed set so that no danger exists that the CPB will handle the call the processing of which has already been started by the CPA.

The interrupted clock interrupt subprogram SP3 in the CPA is continued and finished. Afterwards the CIP is continued with the examination of the so-called next in process called line hopper NCDLH. This operation is controlled by the order 06 (FIG. 4) and is schematically represented by the coincidence gate G130 the inputs of which are connected to the outputs 06 of the CIP and *f* of the NCDLH (FIG. 10) and the output *g*130 of which is connected to the subprogram SP21. The output *f* in the activated condition schematically indicates that the NCDLH contains information. It is supposed that this is not so due to which the clock interrupt program CIP IS continued and finished by setting the TMD interrupt bistate device TMDIB, this operation being controlled by the order 03 and represented by a block indicated by 03 and connected to the set input of the TMDIB. Due to this a TMD interrupt program is no longer prevented from taking place in the processor CPA.

Afterwards the base level program BLP is started so that the following subprograms and operations are executed in succession, all these subprograms being executed at a rhythm which is a submultiple of the rhythm at which the clock interrupt programs are executed:

- examination of the value indicated by the counter of 11 C1 associated to the subprogram SP5 (FIG. 4), this counter C1 being stepped every 14 milliseconds by the clock CL. This examination operation is controlled by the order 06 and is schematically represented by the coincidence gate G126 the inputs of which are connected to the outputs 06 of the block 06 and *c*1 of the counter C1 and the output *g*126 of which is connected to the SP5. This output *g*126 is activated only when the counter C1 has attained its eleventh and final position corresponding to 154 milliseconds and in this case the subprogram SP5 is executed, as required. Thereafter the counter C1 is reset. It should be noted that in case the output *g*126 is not activated the counter C2 (FIG. 5) is directly examined (not shown in detail). The subprogram SP5 consists in the examination of the high rate timing bits HRTB of all the register buffers such as RB. When a HRTB of a register buffer is 0 the HRTB of the following register buffer is examined, whereas in case the HRTB of a register buffer is 1 the time counter bit TCB of this register buffer is examined and other subprograms SP16, SP17, to be described later are executed depending on this TCB being 0 or 1 respectively. From the above it follows that, depending on the set or reset condition of the HRTB of a register the time counter bit TCB is examined or not and since the HRTB of a register is examined every 154 milliseconds this means that in a register wherein the HRTB is set the TCB is examined every 154 milliseconds. The above subprogram SP5 is not described in detail and is represented by a block having two outputs 0 and 1 which are activated when the TCB of the register buffer RB examined are 0 and 1 respectively. When the HRTB of all the register buffers examined are 0, the following subprogram is started.
- examination of the value indicated by the counter of 11 C2 associated to the subprogram SP6 (FIG. 5), this counter C2 being stepped every 14 milliseconds by the clock CL. This examination operation is schematically represented, in the same manner as for the counter C1, by the block 06 and the coincidence gate G127 the output *g*127 of which is connected to the SP6 which is executed when this output *g*127 is activated, as required. Thereafter the counter C2 is reset. When this output *g*127 is not activated the counter C3 (FIG. 5) is directly examined (not shown in detail). This subprogram SP6 (FIG. 5) consists in the examination of the timing bits TB of all the auxiliary register buffers such as ARB. When a TB of an auxiliary register buffer is 0 the TB of the following auxiliary register buffer is examined, whereas in case the TB of such a buffer is 1 another subprogram SP25, to be described later, is executed. From the above it follows that the TB of a register is examined every 154 milliseconds. The subprogram SP6 is represented by a block having two outputs 0 and 1 which are activated when the TB of the auxiliary register buffer examined are 0 and 1 respectively. When the TB of all the ARB examined are 0, the following subprogram is executed.
- examination of the value indicated by the counter of 11 C3 associated to the subprogram SP7 (FIG. 5), this counter C3 being stepped every 14 milliseconds by the clock CL. This examination operation is schematically represented by the block 06 and the coincidence gate G128 the output *g*128 of which is connected to the SP7 which is executed when this output *g*128 is activated, as is supposed. Thereafter the counter C3 is reset. It should be noted that when this output *g*128 is not activated the examination of the counter C4 is performed directly (not shown in detail). This subprogram SP7 consists in the examination of the high rate timing bits HRTB of the various supervision buffers such as SB. When the HRTB of a supervision buffer is 0 the HRTB of the following supervision buffer is examined, whereas in case the HRTB of such a buffer is 1 the TC of this buffer is examined and eventually further operations are executed (subprograms SP29, SP30 to be described later). From the above it follows that in a supervision register wherein the HRTB is set the TC is examined every 154 milliseconds. The subprogram SP7 is represented by a block having two outputs 0 and 1 which are activated when the HRTB of the supervision buffer SB examined are 0 and 1 respectively. It is supposed that the HRTB of all the SB are 0 so that consequently the following subprogram is executed.
- examination of the value indicated by the counter of 11 C4 associated to the subprogram constituted by the operation 06 (FIG. 6), this counter C4 being stepped every 14 milliseconds by the clock CL. This examination operation is schematically represented by the block 06 and the coincidence gate G129 the output *g*129 of which is connected to the order 06, associated to the counter C4, the operation indicated by order 06 being executed when this output *g*129 is activated. Thereafter the counter C4 is reset. When this output *g*129 is not activated the examination of the counter C5 (FIG. 6) is directly performed (not shown in detail). The latter operation which is executed every 154 milliseconds consists in the examination of the originating call hopper OCH (FIG. 10) wherein the equipment numbers of calling lines requiring the connection to a register are inscribed. This operation is controlled by the order 06 and is schematically represented by the coincidence gate G131 (FIG. 6) the inputs of which are connected to the outputs 06 of the CIP and *f* of the OCH and the output *g*131 of which is connected to the SP8. The schematic output *f* of the OCH in the activated condition schematically indicates that at least one CGLEN is inscribed therein. When this is the case the subprogram SP8 (FIG. 6) comprising the following operations is started:
- reading of a memory block MB2 (FIG. 10) of the central memory in which the address RBA of a free register buffer RB is stored and finding of this register buffer RB by means of this address RBA. This operation is controlled by the order 05 and is schematically represented by the coincidence gate G15 the inputs of which are connected to the outputs 05 of the SP8 and *rba* of the above memory block MB2 and the output *g*15 of which is connected to the free register buffer RB (FIG. 11) via a mixer M1. The schematic output lead *f* of the register buffer RB in the activated condition schematically indicates that this register buffer has been found or is being interrogated;

reading of the RBA in the above MB2 and transfer of this RBA to a work register WR (FIG. 11) wherein this information is temporarily stored. This operation is controlled by the order 01 and is schematically represented by the coincidence gate G132 the inputs of which are connected to the outputs 01 of the SP8 and *rba* of the MB2 and the output *g*132 of which is connected to the case RBA of the WR via the mixer M13;

setting of the low rate timing bit LRTB in the register buffer RB (FIG. 11) found. This operation is controlled by the order 03 and is schematically represented by the coincidence gate G48 the inputs of which are connected to the outputs 03 of the SP8 and *f* of the RB and the output *g*48 of which is connected to the set inputs of the case LRTB of the RB via the mixer M10. As will be explained later, due to the LRTB of the register being in its set condition the time counter bit TCB thereof will be examined at every 15 seconds approximately under the control of a base level subprogram SP10.

reading of the calling line equipment number CGLEN in the OCH (FIG. 10) and transfer of this information to the register buffer RB found. This operation is controlled by the order 01 and is schematically represented by the coincidence gate G16 the inputs of which are connected to the outputs 01 of the SP8, *f* of the RB and *cglen* of the OCH and the output *g*16 of which is connected to the case CGLEN of the RB;

interrogation of the normal/abnormal line table NALT (FIG. 11) by means of the calling line equipment number CGLEN stored in the OCH. This operation is controlled by the order 06 and is schematically represented by the coincidence gate G17 the inputs of which are connected to the outputs 06 of the output SP8 and *cglen* of the OCH and the output *g*17 of which is connected to the input of the NALT via the mixer M3. The order 06 also controls one input of the coincidence gate G18 the other input of which is connected to the output *n* of the NALT, the latter output being activated when the line by which the NALT is interrogated is a normal one.

When the calling line is a normal one so that the output *g*18 of the gate G18 is activated, the subprogram SP9 (FIG. 6) comprising the following operations is executed:

reading of the RBA in the WR (FIG. 11) and transfer of this information to the TMDH (FIG. 12). This operation is controlled by the order 01 and is schematically represented by the coincidence gate G19 the inputs of which are connected to the outputs 01 of the SP9 and *rba* of the work register WR and the output *g*19 of which is connected to the case RBA of the TMDH via the mixer M4. By the transfer of the RBA to the TMDH is indicated that this RBA must be processed as soon as possible under the control of an asynchronous switching or TMD interrupt program involving the processor CPA and the TMD41 which is included in the same peripheral module PM1 as the calling line.

stepping of the sequential order of the register buffer RB (FIG. 11) to its first position wherein its schematic output *s*1 is activated and indicates that the calling line must be connected to a free junctor under the control of a tester marker driver interrupt program. This operation is controlled by the order 07 and is schematically represented by the coincidence gate G49 the inputs of which are connected to the outputs 07 of the SP9 and *f* of the RB and the output *g*49 of which is connected to the case SEQ of the RB via the mixer M5.

The base level program BLP further also comprises the following operations and subprograms (FIG. 6) which are executed in succession when the above described subprograms are finished and when no program of higher priority takes place. All these subprograms are also executed at a rhythm which is a submultiple of the rhythm at which the clock interrupt programs are executed:

examination of the value indicated by the counter of 1,072 C5 associated to the subprogram SP10, this counter being stepped every 14 milliseconds by the clock CL. This examination operation is controlled by the order 06 and is schematically represented by the coincidence gate G139 the inputs of which are connected to the outputs 06 of the block 06 and 05 of the counter C5 and the output *g*139 of which is connected to the SP10. This output *g*139 is activated only when the counter C5 has attained its 1,072nd and final position corresponding to 1,071 × 14 milliseconds or approximately 15 seconds, and in this case the subprogram SP10 is executed, as required. When the output *g*139 is not activated the counter C6 is directly examined (not shown in detail). The subprogram SP10 consists in the examination of the LRTB of the various register buffers such as RB. When a LRTB of a register buffer is 0 the LRTB of the following register buffer is examined, whereas in case the LRTB of such a buffer is found to be 1 the time counter bit TCB is examined and depending on the TCB being 0 or 1 another subprogram is executed. From the above it follows that in a register wherein the LRTB is set the TCB is examined every 15 seconds. The subprogram SP10 is represented by a block having two outputs 0 and 1 which are activated when the TCB of the RB examined are 0 and 1 respectively. Since the LRTB and the TCB of the RB (FIG. 11) examined are 1 (set during the SP8) and 0 respectively, the output 0 of the SP10 is activated and the following subprogram SP11 is executed. This subprogram consists in the setting operation of the TCB of the RB and is controlled by the order 03. It is schematically represented by the coincidence gate G59 the inputs of which are connected to the outputs 03 of the SP11 and *f* of the RB examined and the output *g*52 of which is connected to the case TCB of the RB via the mixer M19;

examination of the value indicated by the counter of 1,572 C6 associated to the subprogram SP12 and stepped every 14 milliseconds by the clock CL. This examination operation is schematically represented by the block 06 and the coincidence gate G140 the output *g*140 of which is connected to the SP12 which is executed when the output *g*140 is activated. This happens when the C6 has attained its 8,572nd position corresponding to 8,571 × 14 milliseconds or approximately 2 minutes. After the execution of the SP12 the counter C6 is reset.

The subprogram SP12 consists in the examination of the low rate timing bits LRTB of the various supervision buffers such as SB. When a LRTB of a supervision buffer is 0 the LRTB of the following supervision buffer is examined, whereas in case the LRTB of such a buffer is 1 the TC of this buffer is examined and eventually further operations are executed. From the above it follows that in a supervision register wherein the LRTB is set, the TC is examined every 2 minutes. The subprogram SP12 is represented by a block having two outputs 0 and 1 which are activated when the LRTB of the supervision buffer SB examined are 0 and 1 respectively. It is supposed that the LRTB of all the SB examined are 0.

At the moment a 7 milliseconds period of the 14 milliseconds time interval between two successive clock interrupts is finished a clock interrupt program CIP' is started in processor CPB due to which, in the same manner as described above for central processor CPA, a clock interrupt message CIM' indicating the start of this CIP' is first written in the interprocessor communication hopper ICH' (FIG. 14) of processor CPB and then transferred to the interprocessor register buffer IRBA (FIG. 13) under the control of an interprocessor output interrupt program IOIP' in processor CPB. Afterwards the interrupted clock interrupt program in processor CPB is continued, but meanwhile the following happens in processor CPA. When the interprocessor message buffer IMB (FIG. 12) of the processor CPA is idle (output *e* activated) whereas the interprocessor interrupt bistable IIIB (not shown) of this processor CPA is in its one-condition, as is supposed, due to no program of higher priority taking place, and since moreover the busy/idle bistable BS' of the IRBA has been brought in its one-condition after the transfer of the CIM' the output of the coincidence gate G20 (FIG. 13) which constitutes the interprocessor input interrupt program source is activated so that the resultant input interrupt signal IIS interrupts the program taking place in the processor CPA and starts an interprocessor input interrupt program IIIP (FIG. 9). In an analogous manner as described above for the processor CPB, this program controls the transfer of the clock interrupt message CIM' from the IRBA (FIG. 13) to the interprocessor message buffer IMB (FIG. 12) of processor CPA as schematically represented by coincidence gate G21. Further the IRBA bistate device BS' is reset when this register becomes empty, as schematically represented by the coincidence gate G22 and finally the various TMD flags such as TMDF (FIG. 12) of TMDA1 are set when the CIM' has been received in the IMB, this operation being schematically represented by the coincidence gate G23.

Due to the RBA having been registered in the TMDH (FIG. 12) the schematic output *f* of the latter is supposed to be activated and since also the TMDF included in the TMDA1 to which the RBA must be transmitted is in its set condition, the output *g*24 of the coincidence gate G24 (FIG. 12) is activated. Consequently the TMD seizure bistate device TMDS included in the TMDA1 is set, thus indicating that information must be transmitted to the TMDA1. This information may however not be transmitted to this TMDA1 when the latter is already busy, this being indicated by the BIB being in its set condition, or when the TMDS' or the BIB' of the TMDB1 included in the same peripheral module PM1 and associated to the CPB is in its set condition. The former condition is necessary in order that the TMDA1 should be able to continue and finish an operation already started during the second half period of a preceding time interval of 14 milliseconds and the latter conditions are required in order that the processors CPA and CPB which are associated to TMDA1 and TMDB1 respectively should not simultaneously perform control operations in the switching network part SN1 of the same peripheral module PM1. Hence in the above case a request for the execution of a tester marker driver interrupt program is only possible when the TMDS is in its one-condition and when the BIB, BIB' and TMDS' are in their reset condition. It is supposed that this is the case so that the output of the gate G25 is activated, this gate constituting the first auxiliary asynchronous switching control or TMD interrupt source included in TMDA1. When operated this source hence requests for the execution of a first asynchronous switching or TMD interrupt program controlling the transmission of information from the processor CPA to TMDA1.

Each TMD circuit such as TMDA1 also includes a second auxiliary TMD interrupt source *eoo* (FIG. 12) which when operated requests for the execution of a second TMD interrupt program controlling the transmission of information from TMDA1 to the processor CPA.

The outputs of the above first (G25) and second (*eoo*) auxiliary TMD interrupt sources are connected to the first and second inputs of a first mixer M6 the output of which is hence activated when the TMDA1 requests for the execution of a first or a second TMD interrupt program. The outputs of the first mixers associated to the various TMD circuits TMDA1 to TMDA*n*, themselves associated to the processor CPA, are connected to a second mixer M7 the output of which constitutes the one input of a coincidence gate G26 the other input of which is activated when the TMDIB is in its set condition i.e. when no interrupt program of higher priority than the TMD interrupt program is taking place in the CPA. The gate G26 constitutes the main TMD interrupt source.

It should be noted that the auxiliary TMD interrupt sources included in the TMDB1 to TMDB*n* are connected in the same manner as those included in the TMDA1 to TMDA*n* and that there is also a single main TMD interrupt source.

From the above it follows that the main interrupt source G26 associated to the CPA may only be operated, in case information must be transmitted from the CPA to a TMD circuit such as TMDA1, during the second half period of the time interval of 14 milliseconds elapsing between two successive starts of clock interrupt programs in the CPA. The same is true for the main interrupt source associated to the CPB. Since the starts of the clock interrupt programs of the CPA and the CPB are shifted by 7 milliseconds it is clear that the processors CPA and CPB are given alternately access to the switching network part of each module. But it is clear that one processor may cooperate with an associated TMD circuit of a module while simultaneously the other processor cooperates with an associated TMD circuit of another module since the gate G25 only realizes an exclusion between the TMD circuit of a same module.

From the above it also follows that the main interrupt source G26 associated to the CPA is only prevented from being operated, in case information must be transmitted from a TMD circuit to the CPA, when the TMDIB is in its zero-condition i.e. when an interrupt program of higher priority than a TMD interrupt program is taking place. No conflict is indeed possible between the processors CPA and CPB since when there are two simultaneous requests one is sure that they emanate from TMD circuits belonging to distinct modules.

It should further be noted that TMD circuits have been associated to each processor in order that they should execute asynchronous operations which do not require the intervention of this processor. Thus during these operations no processing time of the processor is consumed.

When the output of gate G25 being activated and the TMDIB is in its set condition the output gate G26 is activated. The resultant TMD interrupt signal starts a TMD interrupt subprogram TMDIP1 (FIG. 7) which consists in the scanning of the outputs of the gates G25 and of the leads *eoo* of the TMD circuits TMDA1 to TMDA*n* and in the selection of an activated one among them. These operations are controlled by the order 08 which is presented by a block having two outputs 081 and 082 which are supposed to be activated when the activated output of the gate G25 of TMDA1 and the activated output *eoo* of the TMDA1 have been selected respectively.

When the output 081 is activated, the TMD interrupt subprogram TMDIP1 is followed by the execution of the TMD subprogram TMDIP2 which together with TMDIP1 constitutes the above mentioned first TMD interrupt subprogram. This subprogram comprises the following operations:

- setting of the TMD busy/idle bistate device BIB (FIG. 12) thus preventing a TMD interrupt signal from being generated in the TMDA1 considered. This operation is controlled by the order 03 represented by a block connected to the one-input of the BIB;
- reading of the RBA in the TMDH (FIG. 12) and finding of the RB (FIG. 11) by means of this address. This operation is controlled by the order 05 and is schematically represented by the coincidence gate G27 the inputs of which are connected to the outputs 05 of TMDIP2, *s*1—2, *s*4—5 of the RB and *rba* of the TMDH and the output *g*27 of which is connected to the RB via the mixer M1. It should be noted that the outputs *s*1—6 of the RB are activated when the SEQ thereof is in its position 1—6 respectively. Presently this SEQ is in position 1 so that the output *s*1 is activated.
- reading of the RBA in the TMDH and transfer of this information to the TMD buffer TMDB (FIG. 12). This operation is controlled by the order 01 and is schematically represented by the coincidence gate G28 the inputs of which are connected to the outputs 01 of the TMDIP2, *s*1—2, *s*4—5 of the RB and *rba* of the TMDH and the output *g*28 of which is connected to the case RBA of the TMDB. It should be noted that the transfer of the RBA to the TMDB is performed in order to permit the corresponding register RB to be found back when the TMD operation has been finished, as will become clear later.

reading of the first sequential order (connect calling line to a free junctor) in the register buffer RB found and transfer of this sequential order to the TMD buffer register TMDRA (FIG. 12) via the peripheral register PRA1. This operation is controlled by the order 01 and is schematically represented by the coincidence gate G29 the inputs of which are connected to the outputs 01 of TMDIP2 and *f* and *s*1 of the RB found and the output *g*29 of which is connected to the input of the TMDRA via the mixer M8, the bus BA and the peripheral register PRA1, this latter bus and register being only shown in FIG. 1. The sequential order consists in searching for a free path between the calling line and a free junctor (test operation) and in establishing this path (marker-driver operation). During the execution of this test operation the TMD and the CPA operate on line i.e. they mutually exchange information concerning the test executed without TMD interrupts being required. This test operation is executed by the tester of the TMDA1 which searches for a free path between the calling line and a free junctor by interrogating the network. At the end of this test operation the identity of this path is transmitted to the marker-driver of TMDA1 and the address of the junctor JA selected is inscribed in the register buffer RB. The latter operation is schematically represented by an arrow marked T at the input of the case JA of the RB. After this test operation is finished the TMD is disconnected from the CPA and the interrupted program is continued.

Meanwhile the TMD executes the above marker-driver operation by establishing the connection between the calling line and the junctor. Consequently the well known cutoff relay *Cor* associated to the line is energized. From that moment on it is impossible to test the loop condition of the calling line by scanning the corresponding line input since the line scanner is prevented from having access to this line input by the change of position of contacts of the operated cutoff relay (not shown). It should be noted that during the above establishment of the connection by the TMD circuit a plurality of clock interrupt programs and base level programs are executed in the CPA. At the start of each such clock interrupt program the TMD seizure bistate device TMDS is however not reset since the busy/idle bistate device BIB (FIG. 12) remains in its one-condition. When the establishment of the connection has been finished the end-of-operation output lead *eoo* (FIG. 12) (second auxiliary TMD interrupt source) of the TMDRA is activated so that the BIB (FIG. 12) is reset and that the output *g*26 of the gate G26 (main TMD interrupt source) is activated via the mixers M6 and M7 when the one-output of the TMDIB is activated, as required. Thus the execution of a second TMD interrupt subprogram TMDIP1,3 is requested. In the same manner as described above first the TMDIP1 is executed, but now the output 082 is activated so that subsequently the TMD interrupt subprogram TMDIP3 (FIG. 8) comprising the following operation is started and executed. Hereby the inputs *s*1 of the gates involved are supposed to be activated since the TMD operation still concerns the first sequential order.

reading of the RBA in the TMDB (FIG. 12) and finding of the above RB by means of this address. This operation is controlled by the order 05 and is schematically represented by the coincidence gate G31 the inputs of which are connected to the outputs 05 of TMDIP3, *s*1--2, *s*4—4 of the RB and *rba* of the TMDB and the output *g*31 of which is connected to the RB (FIG. 11) via the mixer M1;

reading of the RBA in the TMDB (FIG. 12) and transfer of this address to the TMDH (FIG. 12) thus indicating that the execution of another first TMD interrupt subprogram is requested. This operation is controlled by the order 01 and is schematically represented by the coincidence gate G133 the inputs of which are connected to the outputs 01 of the TMDIP3, *rba* of the TMDB and *s*1, *s*4 of the RB. The output *g*133 of the gate G133 is connected to the case RBA of the TMDH via the mixer M4;

reading of the RBA in the TMDB and transfer of this address to the WR (FIG. 11). This operation is controlled by the order 01 and is schematically represented by the coincidence gate G33 the inputs of which are connected to the outputs 01 of the TMDIP3, *s*1 of the RB and *rba* of the TMDB and the output *g*33 of which is connected to the case RBA of the WR via the mixer M13;

reading of the junctor address JA in the RB found and finding of the associated junctor status buffer JSB (FIG. 10) be means of this address. When found the schematic output *f* of this JSB is activated. This operation is controlled by the order 05 and is schematically represented by the coincidence gate G34 the inputs of which are connected to the outputs 05 of the TMDIP3, *f*, *s*1 and *ja* of the RB and the output *g*34 of which is connected to the input of the JSB via the mixer M9;

reading of the junctor address JA in the RB found and transfer of this address to the ICH (FIG. 12) thus indicating that this JA must be transferred to the CPB. This operation is controlled by the order 01 and is schematically represented by the coincidence gate G35 the inputs of which are connected to the outputs 01 of TMDIP3, *f*, *s*1 and *ja* of the RB and the output *g*35 of which is connected to the case JA of the ICH via the mixer M11;

resetting of the bit B of the JSB found, the thus reset bit indicating that the call is treated by the corresponding processor CPA. This operation is controlled by the order 02 and is schematically represented by the coincidence gate G36 the inputs of which are connected to the outputs 02 of TMDIP3, *f* of the JSB and *s*1 of the RB and the output *g*36 of which is connected to the case B of the JSB;

reading of the RBA in the WR and transfer of this address to the JSB found. This operation is controlled by the order 01 and is schematically represented by the coincidence gate G37 the inputs of which are connected to the outputs 01 of the TMDIP3, *rba* of the WR, *f* of JSB and *s*1 of the RB and the output *g*37 which is connected to the case RBA of the JSB. Upon the receipt of the RBA in the JSB the phase P thereof is stepped (not shown) to its first condition 001 indicating that the call handled is in the register buffer phase. Due to this the schematic output lead *p*1 of the JSB is supposed to be activated.

reading of the phase P (more particularly *p*1) in the above JSB and transfer of this information to the ICH (FIG. 12) thus indicating that the P must be transferred to the CPB. This operation is controlled by the order 01 and is schematically represented by the coincidence gate G38 the inputs of which are connected to the outputs 01 of the TMDIP3, *f* of the JSB, *s*1 of the RB and *p*1 of JSB and the outputs *g*38 of which is connected to the case P of the ICH via the mixer M12.

finally, stepping of the sequential of the register RB found to its second position. This operation is controlled by the order 07 and is schematically represented by the coincidence gate G32 the inputs of which are connected to the outputs 07 of the TMDIP3, *s*1—2, *s*4—5 and *f* of the RB and the output *g*32 of which is connected to the case SEQ of the RB via the mixer M5. The sequential is now in its second position wherein output *s*2 is activated and which indicates that in the junctor a feeding bridge must be connected to the calling line and that dial tone must be sent to the calling subscriber;

Due to the ICH containing the JA and the P (*p*1) and when the other already above described necessary conditions are fulfilled an interprocessor output interrupt signal OIS starts an IOIP (FIG. 9). During the execution of this second IOIP for the call treated (*ioi*2 activated), the JA and the P (*p*1) stored in the ICH are transferred to the IRAB (FIG. 13) via the coincidence gates G40 and G41 (FIG. 9) respectively. This interrupt program is completely analogous to the IOIP already described above and is therefore not described in detail.

The interrupted program in the CPA is then continued. Meanwhile the JA and the P stored in the IRAB are transferred to the IMB' (FIG. 14) of processor CPB during an input interrupt program IIIP' (FIG. 14) and via the coincidence gates G43 and G44. Also this program is not described in detail since it is analogous to the IIIP' described above.

When received in the IMB' of the CPB the JA permits to find the corresponding junctor status buffer JSB' after which the P is inscribed in this JSB'. Since the P is a register buffer phase the output p1 of the JSB' is activated. Also the bit B is set in this JSB' indicating that the call is treated by the other processor CPA. This information p1 and B will enable the CPB to further handle the call treated by the CPA when the latter processor becomes faulty, as will be described later. It should be noted that the finding of the JSB' by means of JA and the inscription of P and the setting of B in the JSB' found are executed under control of orders always accompanying information transmitted from one processor to the other.

The interrupted program in the CPA is continued, as mentioned above. The TMDH containing the RBA, when at a certain moment the required conditions are fulfilled the program taking place is interrupted and a first TMD subprogram TMDIP1,2 (FIG. 7) is executed which comprises the above described operations.

03: setting of the BIB;

05 (gate G27): finding of the RB;

01 (gate G28): transfer of the RBA from the TMDH to the TMDB; and the following other operations:

reading of the second sequential order (connect feeding bridge and send dial tone) in the register buffer RB found and transfer of this sequential order to the TMDRA. This operation is controlled by the order 01 and is schematically represented by the coincidence gate G46 the inputs of which are connected to the outputs 01 of TMDIP2 and *f* and *s*2 of the RB and the output *g*46 of which is connected to the input of the TMDRA (FIG. 12) via the mixer M8, the bus BA and the peripheral register PRA1;

reading of the JA in the RB found and transfer of this information to the TMDRA. This operation is controlled by the order 01 and is schematically represented by the coincidence gate G50 the inputs of which are connected to the outputs 01 of TMDIP2,*f*, *s*2 and *s*4 of the RB, and the output *g*50 of which is connected to the TMDRA via the mixer M8, the bus BA and the peripheral register PRA1.

The interrupted program is then continued. Meanwhile the TMD connects a feeding bridge in the junctor found by means of the JA, and sends dial tone to the calling subscriber. Herein it should be noted that after the connection of such a feeding bridge the condition of the loop on the calling side of the junctor i.e. of the loop including the first junctor input is indicated by the state of a contact JI11 (not shown) which is examined during every subprogram SP1 of a clock interrupt program CIP as already mentioned above. At the moment the above TMD operation is finished the output lead *eoo* of the TMDRA is activated. When the TMDIB is in its one-condition the program taking place in the CPA is interrupted and a second TMD subprogram TMDIP1,3 (FIG. 8) is executed which comprises the following operations:

05 (gate G31): finding of the RB;

reading of the junctor address JA in the RB found and finding of the associated junctor input buffer JIB11 (FIG. 10). When found the schematic output *f* of this JB JIB11 is supposed to be activated. This operation is controlled by the order 05 and is schematically represented by the coincidence gate G51 the inputs of which are connected to the outputs 05 of TMDIP3,*f*, *s*2 and *ja* of the RB and the output *g*51 of which is connected to the input of the JIB11 via the mixer M16;

setting of the bit BJ11 of the JIB11 found thus indicating the closed condition of the loop including contact JI11. This operation is controlled by the order 03 and is schematically represented by the coincidence gate G52 the inputs of which are connected to the outputs 03 of TMDIP3,*f* of the JIB11 and *s*2 of the RB and the output *g*52 of which is connected to the set input *s* of the case BJ11 of the JIB11 via the mixer M17. Due to the bit BJ11 being immediately updated instead of awaiting the execution of a subprogram SP1 no mismatch will normally be detected when comparing the previous and present states of the junctor input considered during such a subprogram SP1 of a CIP. However, when the calling subscriber prematurely hooks on his telephone for one or other reason this will be detected during this program, so that the operations required in this case can be executed. Since these operations do not form part of the invention they are not described. It should also be noted that the CPB is not formed by the CPA about the setting of the bit BJ11. The CPB will itself detect the loop closure during a subprogram SP'1 corresponding to SP1 and accordingly set the bit BJ'11 in the JIB'11. Here no danger exists that the CPB will seize the junctor already seized by the CPA since the CPB has already been informed thereof. Indeed, as described above a JSB' associated to this junctor has been seized and a bit B indicating that the call is handled by the CPA has been inscribed in this JSB'.

07 (gate G32): by stepping the sequential of the register RB to its third position the latter register RB is informed about the fact that a feeding bridge has been connected and dial tone is being sent.

When receiving dial tone the calling subscriber starts dialling the six-figures directory number CDLDN of a local subscriber each figure or digit of this number being constituted by at least one pulse. Due to this the dial tone is interrupted and the loop between the calling subscriber and the junctor is opened and closed at the rhythm of the dialling so that mismatches will be detected during the subprogram SP1 (FIG. 2) of the clock interrupt program CIP i.e. when the states of the first junctor input JI11, indicating the present state of the junctor loop, and of the corresponding junctor input buffer JIB11, indicating the previous state of the junctor loop, are examined and compared. Indeed, the clock interrupt subprograms SP1 are executed at a rhythm which is considerably higher than the rhythm at which the loop is closed and opened. As already mentioned above the output *10* of SP1 is activated for a loop opening (change of state from 1 to 0), whereas the output *lc* is activated for a loop closure (change of state from 0 to 1). The input of the mixer M18 is connected to both the outputs *lo* to *lc* so that its output *loc* is activated for each change of state.

When the output *loc* is found to be activated during the examination of JI11 and BJ11 the subprogram SP13 (FIG. 2) comprising the following operations is started and executed;

reading of the junctor address JA of the junctor examined, this JA being provided by the SP1 (output *ja*), and finding of the corresponding junctor status buffer JSB and of the corresponding JIB11 by means of this address. This operation is controlled by the order 05 and is schematically represented by the coincidence gate G53 the inputs of which are connected to the outputs 05 of the SP13 and *ja* of the SP1 and the output *g*53 of which is connected to the inputs of the JSB (FIG. 10) and of the JIB11 (FIG. 10) via the mixers M9 and M16 respectively;

resetting or setting of the bit BJ11 of the junctor input buffer JIB11 found. These operations are controlled by the orders 02 and 03 and are schematically represented by the coincidence gates G151 and G152 the inputs of which are connected to the outputs 02 and 03 of the SP13 and *f* of the JIB11 and the outputs *g*151, *g*152 of which is connected to the inputs *r* and *s* (via mixer M17) of the case BJ11 of the JIB11.

examination of the bit B and of the phase P inscribed in the JSB found. When this phase is a register phase (*p*1 activated) whereas the bit B is in its reset condition (call treated by CPA), as is the case, the subprogram SP14 (FIG. 2) is started. This operation is controlled by the order 06 and is schematically represented by the coincidence gate G54 the inputs of which are connected to the outputs 06 of the SP13, *p*1, *b* and *f* of the JSB, and the output *g*54 of which is connected to the subprogram SP14 which comprises the following operations:

reading of the RBA in the JSB found and finding of the RB (FIG. 11) by means of this RBA. This operation is controlled by the order 05 and is schematically represented by the coincidence gate G55 the inputs of which are connected to the outputs 05 of SP14 and *rba* and *f* of the JSB and the output *g*55 of which is connected to the input of the RB via the mixer M1;

resetting of the time counter bit TCB of the RB found. This operation is controlled by the order 02 and is schematically represented by the coincidence gate G56 the inputs of which are connected to the outputs 02 of SP14 and *f* of the RB and the output *g*56 of which is connected to the reset input *r* of the case TCB of the RB.

From the above it follows that the TCB of the RB is reset at each loop opening or closure during the clock interrupt program SP14 executed upon detecting this opening or closure. When the output lead *lo* is found in the activated condition i.e. when a loop opening due to dialling is detected during the CIP subprograms SP1, SP13 the subprogram SP15 is moreover executed since the output *g*67 of the coincidence gate G67 which is controlled by the outputs *g*54 and *lo* of SP1 is then activated. This subprogram SP15 consists in the following operations:

stepping of the pulse counter PC of the RB found. This operation is controlled by the order 07 and is schematically represented by the coincidence gate G57 the inputs of which are connected to the outputs 07 of SP15 and *f* of the RB end and the output *g*57 of which is connected to the case PC of the RB. From the above it follows that the pulse counter PC counts the number of dial pulses constituting a digit of the called subscriber's directory number CDLDN dialled;

setting of the HRTB of the RB found. This operation is controlled by the order 03 and is schematically represented by the coincidence gate G66 the inputs of which are connected to the outputs 03 of the SP15 and *f* of the RB and the output *g*66 of which is connected to the set input *s* of the case HRTB of the RB. Due to the HRTB being 1 and as already mentioned the time counter bit TCB of this RB instead of being examined every 15 seconds by the base level subprogram SP10 will now be examined every 154 milliseconds by a base level subprogram SP5, the latter rhythm being still much smaller than the dialling rhythm;

resetting of the LRTB of the RB found, the LRTB being in its set condition since the seizure of the RB. This operation is controlled by the order 02 and is schematically represented by the coincidence gate G143 the inputs of which are connected to the outputs 02 of the SP15 and *f* of the RB and the output *g*143 of which is connected to the reset input *r* of the case LRTB of the RB.

When the above subprograms SP1 and SP13—15 have been executed during a CIP, the latter program is continued by the subprogram SP2, etc.

During the execution of a following base level subprogram SP5 (FIG. 4) the output O of the block SP5 is activated since when examining the HRTB of the RB this bit is found in its one-condition, whereas the TCB of this RB is found to be in its zero-condition. Due to this subprogram SP16 (FIG. 4) is executed, this subprogram consisting in setting the TCB of the register buffer examined. This operation is controlled by the order 03 of the SP16 and is schematically represented by the coincidence gate G68 the inputs of which are connected to the outputs 03 of SP16 and *f* of the RB and the output *g*68 of which is connected to the set input *s* of the case TCB of the RB via the mixer M19.

From the above it follows that:

at the seizure of the RB the LRTB thereof is set due to which the TCB of this RB is examined at a low rhythm, i.e. every 15 seconds, under the control of the base level subprogram SP16 which sets this TCB;

from the start of the dialling operation the TCB of the RB is reset for each loop opening or closure under the control of the clock interrupt subprogram SP14 executed after this loop opening or closure has occurred;

for each loop opening the examination rhythm of the TCB of the RB is increased from every 15 seconds to every 15 seconds by setting the HRTB and resetting the LRTB of this RB under the control of the clock interrupt subprogram SP15 executed after this loop opening has occurred;

the TCB of the RB examined at a higher rhythm (every 154 milliseconds) under the control of the base level subprogram SP5 is set by the subprogram SP16 when it is found in the reset condition.

Consequently, when during the latter base level subprogram SP5 the TCB of the RB is found in the reset condition, this means that the TCB has been reset since the last execution of the base level program SP5, SP16 during which it was set. Since the TCB can only have been reset under the control of the clock interrupt subprogram SP14 executed after the loop opening has occurred, one is sure that at least one such loop opening has occurred since the last execution of the base level subprogram SP5, SP16.

Also, when the base level subprogram SP5 of the TCB of the RB is found in its set condition, this means that the TCB has not been reset since the last execution of the base level program SP5, SP16 during which it was reset. One is hence sure that no loop opening or closure has occurred since the last execution of this base level subprogram SP5, SP16. Consequently a loop closure or opening of 154 milliseconds is being detected.

In the latter case and due to the output 1 of the SP5 being then activated the base level subprogram SP17 (FIG. 4) is executed in order to find out if the loop has been opened or closed for 154 milliseconds. This subprogram SP17 comprises the following operations:

reading of the JA in the RB (FIG. 11) which is being examined and finding of the corresponding JIB11 (FIG. 10) by means of this JA. This operation is controlled by the order 05 and is schematically represented by the coincidence gate G60 the inputs of which are connected to the outputs 05 of SP17, *ja* and *f* of the RB and the output *g*60 of which is connected to the input of the JIB11 via the mixer M16;

examination of the bit BJ11 of the JIB11. This operation is controlled by the order 06 and is schematically represented by the coincidence gates G61 and G62 which are both connected to the outputs 06 of the SP17 and *f* of the JIB11 and to the zero- and one-outputs of the JIB11 respectively, these outputs being activated when the bit BJI is 0 and 1 respectively.

In case the output *g*61 of gate G61 is activated a loop opening of 154 milliseconds is being detected due to which a general release operation has to be executed since this means that the calling subscriber has prematurely hooked on his telephone.

Contrary, when the output *g*62 of the gate G62 is activated a loop closure of 154 milliseconds is being detected, such a loop closure corresponding to the end of a digit dialled. In this case the subprogram SP18 which comprises the following operation is executed:

reading of the digit stored in the PC of the RB (FIG. 11) examined and transfer of this digit of this digit to the position in the case CDLDN of the RB, this position being indicated by the digit counter DC also forming part of the RB. This operation is controlled by the order 01 and is schematically represented by the coincidence gate G64 the inputs of which are connected to the outputs 07 of the SP18, *pc*, *pos*1—6 and *f* of the RB and the output *g*63 of which is connected to the case CDLDN of the RB. Hereby the lead *pos*1—6 indicates the position in the case CDLDN to which the contents of the PC must be transferred;

stepping of this digit counter DC of the RB to its following position. This operation is controlled by the order 07 and is schematically represented by the coincidence gate G64 the inputs of which are connected to the outputs 07 of SP18 and *f* of the RB and the output *g*64 of which is connected to the case DC of the RB;

resetting of the HRTB of the RB. This operation is controlled by the order 02 and is schematically represented by the coincidence gate G65 the inputs of which are connected to the outputs 02 of the SP18 and *f* of the RB and the output *g*65 of which is connected to the reset input *r* of the case HRTB of the RB;

setting of the LRTB of the RB.

This operation is controlled by the order 03 and is schematically represented by the coincidence gate G141 the inputs of which are connected to the outputs 03 of the SP18 and *f* of the RB and the output *g*141 of which is connected to the set input *s* of the case LRTB of the RB via the mixer M10. Due to the LRTB of the RB being in its set condition the TCB of this RB will be examined every 15 seconds during base level subprograms SP10, if the LRTB is not modified before the execution of such a program.

As soon as a new digit is dialed the LRTB is however reset and the HRTB of the RB is set by a clock interrupt program SP1, SP13, SP15 due to which the TCB of this RB will again be examined every 154 milliseconds.

In the manner described above the various figures or digits of the called subscriber's directory number are successively stored in the case CDLDN of the RB.

After the storage of the second digit during a subprogram SP18 the schematic output *s* of the case DC of the RB is activated and consequently the subprogram SP19 (FIG. 4) is executed, this subprogram consisting in the interrogation of the prefix translator PT (FIG. 11) by means of the part of the called line directory number, i.e. two digits thereof already stored in the case CDLDN of the RB. This operation which is executed in order to know whether the call is a local one or not is controlled by the order 06 and is schematically represented by the coincidence gate G69 the inputs of which are connected to the outputs 06 of the SP19 and *f* and *cdldn* (2 digits) of the RB and the output *g*69 of which is connected to the PT. As the call is a local one the output 1 of the PT is activated. This information is maintained in memory and activates one input of the gate G134 (FIG. 4) giving access to program SP20.

It should be noted that the processor CPB is not informed by the CPA about the various changes which occur in the loop condition including the first junctor input JI11 and the calling line. This processor CPB indeed detects itself these changes during clock interrupt programs and accordingly updates the corresponding junctor input buffer JIB'11.

After the receipt of the last digit, during a subprogram SP18, the output 1 of the case DC of the RB is activated and due to the input 1 of the gate G134 (FIG. 4) being already activated the output *g*134 of this gate is activated so that the following operations of the subprogram SP20 (FIG. 4) are executed:

interrogation of the translator T (FIG. 11) with the called line directory number CDLDN stored in the RB already found during the SP18. This operation is controlled by the order 06 and is schematically represented by the coincidence gate G70 the inputs of which are connected to the outputs 06 of SP20, *f* and *cdldn* of the RB and the output *g*70 of which is connected to the translator T, which provides at its output the called line equipment number CDLEN corresponding to the CDLDN;

interrogation of the normal/abnormal line table NALT (FIG. 11) by means of this CDLEN. This operation is controlled by the order 06 and is schematically represented by the coincidence gate G71 the inputs of which are connected to the outputs 06 of SP20 and *cdlen* of the T and the output *g*71 of which is connected to the input of the NALT via the mixer M3. If the line is a normal one, as is supposed, the output *n* of this NALT is activated. In order to distinguish between the called and the calling line, for which the NALT must also be interrogated, the coincidence gate G72 is provided, the output *g*72 of this gate being activated only when the outputs of the gates G71 and *n* of the NALT are activated;

reading of the CDLEN of the normal line stored in the T and transfer of this information to the next in process called line hopper NCDLH (FIG. 10) indicating that this line has just been called for and that it must be handled during a CIP. This operation is controlled by the order 01 of the SP20 and is schematically represented by the coincidence gate G73 the inputs of which are connected to the outputs 01 of SP20, *cdlen* of T and *g*72 of gate G72 and the output *g*73 of which is connected to the case CDLEN of the NCDLH;

reading of the RBA of the RB examined, this address being provided by the SP5 (output *rba*), and transfer of this information to the NCDLH. This operation is controlled by the order 01 of the SP20 and is schematically represented by the coincidence gate G74 the inputs of which are connected to the outputs 01 of SP20, *rba* of the SP5 and *f* of the RB and the output *g*74 of which is connected to the case RBA of the NCDLH.

As described above the LRTB of the RB is set during a base level subprogram SP10 before dialling and during a base level subprogram SP5, SP17, SP18 after the receipt of each digit dialled, whereas the LRTB is reset during a subsequent clock interrupt program SP1, SP13, SP15 when a new digit is dialled. If no digit is dialled or if the digit dialled is the last one of an incompletely dialled number the LRTB of the RB remains in its set condition so that the TCB of this RB is examined every 15 seconds. Hence during the first following base level subprogram SP10, SP11 the TCB of this RB is set and it is not reset during a following clock interrupt subprogram SP1, SP13, SP15 since the junctor loop remains closed. During the following base level subprogram SP10, SP11 executed 15 seconds after the preceding one, the TCB of the RB is hence found in 1 so that an incomplete number or a false call is being detected. The operations executed in such cases are not described further since they do not form part of the invention.

When during a CIP (FIG. 4) the NCDLH is examined and a called line equipment number CDLEN is found inscribed therein (schematic output *f* supposed to be activated) the output of the gate G130 (FIG. 4) is activated and consequently the following subprogram SP21 is executed, this subprogram comprising the following operations:

reading of the called line equipment number CDLEN in the NCDLH and finding of the corresponding line input buffer LIB2 (FIG. 10). This operation is controlled by the order 05 and is schematically represented by the coincidence gate G75 the inputs of which are connected to the outputs 05 of the SP21 and *cdlen* of the NCDLH and the output *g*75 of which is connected to the input of the LIB2. When the LIB2 is found its schematic output *f* is supposed to be activated;

examination of the bit BL2 of this LIB2. This operation is controlled by the order 06 and is schematically represented by the coincidence gate G76 the inputs of which are connected to the outputs 06 of the SP21 and the *f* and zero-outputs of the LIB2 and the output *g*76 of which is hence activated only when this BL2 is 0. This is the case when the called line is free, as is supposed. The activated output of the gate G76 then starts the clock interrupt subprogram SP22 (FIG. 4) which comprises the following operations:

setting of the bit BL2 in the LIB2 (FIG. 10) found in order to make the corresponding called line busy in the memory of the CPA. In this manner this line cannot be called for by another subscriber. This operation is controlled by the order 03 and is schematically represented by the coincidence gate G135 the inputs of which are connected to the output 03 of the SP22 and *f* of the LIB2 and the output *g*135 of which is connected to the set input *s* of LIB2;

reading of the RBA stored in the NCDLH (FIG. 10) examined and finding of the corresponding RB (FIG. 11). This operation is controlled by the order 05 and is schematically represented by coincidence gate G77 the inputs of which are connected to the outputs 05 of the SP22 and *rba* of the NCDLH and the output *g*77 of which is connected to the RB via the mixer M1;

reading of the CDLEN stored in the NCDLH examined and transfer of this information to the RB found. This operation is controlled by the order 01 and is schematically represented by the coincidence gate G78 the inputs of which are connected to the outputs 01 of SP22, *f* of the RB and *cdlen* of the NCDLH and the output *g*78 of which is connected to the case CDLEN of the RB;

stepping of the sequential of the RB found to its fourth position wherein it indicates that the junctor must be connected to the called line. This operation is controlled by the order 07 and is schematically represented by the coincidence gate G79 the inputs of which are connected to the outputs 07 of SP22 and *f* of the RB and the output *g*79 of which is connected to the case SEQ of the RB via the mixer M5;

reading of the RBA in the NCDLH examined and transfer of this information to the TMDH (FIG. 12) thus indicating that as soon as possible a TMD interrupt program must be executed. This operation is controlled by the order 01 and is schematically represented by the coincidence gate G80 the inputs of which are connected to the outputs 01 of the SP22 and *rba* of the NCDLH and the output *g*80 of which is connected to the case RBA of the TMDH via the mixer M4;

reading of the CDLEN in the NCDLH examined and transfer of this information to the so-called In process called line hopper IPCDLH (FIG. 10) in order to indicate that this line is a called one and to the ICH (FIG. 12) in order to indicate that this CDLEN must be transferred to the CPB. This operation is controlled by the order 01 and is schematically represented by the coincidence gate G81 the inputs of which are connected to the outputs 01 of SP22 and *cdlen* of the NCDLH and the output *g*81 of which is connected to the input of the IPCDLH and to the case CDLEN of the ICH via the mixer M22.

In connection with the above it should be noted that the setting of the line bit BL2 of the called line has not been done immediately i.e. during the base level subprogram SP5, SP20 during which the end of the dialled number was detected, but during the just described subsequent clock interrupt program SP21—22. Indeed, after its detection this number has only been inscribed in the NCDLH. By setting the bit BL2 during a CIP the other processor CPB cannot seize the same line since the starts of the CIP in this processor are shifted by 7 milliseconds with respect to the starts of the CIP in the CPA. Such a simultaneous seizure would have been possible if the BL2 bit would have been set during the above base level subprogram (SP20) since the base level programs of both processors are not synchronized.

When during the subsequent CIP the subprogram SP3 (FIG. 3) is executed a 0/1 mismatch is detected for the called line as the bit BL2 thereof has been set. Due to this the output lead 0/1 of the SP3 is activated and consequently the subprogram SP23 consisting in the examination of the IPCDLH (FIG. 10) is executed. This operation is controlled by the order 06 and is schematically represented by the coincidence gate G82 the inputs of which are connected to the outputs 06 of the SP23 and *f* of the IPCDLH, this schematic output *f* being supposed to be deactivated when the line equipment number corresponding to the mismatch detected is found written in the IPCDLH and the output *g*82 of which is connected to the subprogram SP24. Since the CDLEN is inscribed in the IPCDLH the output of the gate G82 is deactivated and the subprogram SP24 is not executed. It should be noted that the above examination of the IPCDLH is necessary since the 0/1 mismatch is indicative both for a called line and for a releasing line. Indeed, a busy called line has a nonoperated cutoff relay and an open loop both these conditions giving 0 at the output of an OR gate (not shown), whereas the line bit BL2 is set. On the other hand a releasing line also has a nonoperated cutoff relay, an open loop and a set BL bit. In the case the output of the above gate G82 is activated this means that the line examined is a releasing one due to which the subprogram SP24 is executed, this subprogram consisting in the resetting of the BL bit, as will be described later.

Due to the ICH (FIG. 12) containing the CDLEN and when the other necessary conditions are fulfilled an OIS starts an IOIP (FIG. 9). During the execution of this third IOIP for the call treated (*ioi*3 activated) the CDLEN stored in the ICH is transferred to the IRAB via the coincidence gate G83. This program is completely analogous to the IOIP already described above and this description is therefore not repeated. The interrupted program in the CPA is then continued. Meanwhile the CDLEN stored in the IRAB is transferred to the IMB′ of processor CPB during an IIIP′ (FIG. 14) and via the coincidence gate G84. Also this program is not described in detail since it is analogous to the IIIP′ described above. When received in the IMB′ of the CPB the CDLEN permits to find the corresponding LIB′2, to set the bit BL′2 thereof and to write this CDLEN in the IPCDLH′. Thus the CPB is informed about the fact that the line corresponding to the LIB′2 is in the called condition so that it will not handle the line already handled by the CPA and that it will recognize the line as a called line and not as a releasing line.

The interrupted program in the CPA is continued, as mentioned above, and when at a certain moment the other conditions required are fulfilled a TMDIS (FIG. 12) appears at the output of the gate G26 due to the TMDH containing information, so that the program taking place is interrupted and that a subprogram TMDIP 1—2 (FIG. 7) is executed which comprises the above described operations:

03 : setting of the BIB;

05 (gate G27) : finding of the RB;

01 (gate G28) : transfer of the RBA from TMDH to TMDB;

01 (gate G50) : transfer of the JA from the RB to the TMDRA; and the following other operations:

reading of the fourth sequential order (connect junctor to the called line) in the RB found and transfer of this sequential order to the TMDRA (FIG. 12). This operation is controlled by the order 01 and is schematically represented by the coincidence gate G85 the inputs of which are connected to the outputs 01 of TMDIP2 and *f* and *s*4 of the RB and the output *g*85 of which is connected to the input of the TMDRA via the mixer M8, the bus BA and the peripheral register PRA1;

reading of the CDLEN in the RB found and transfer of this information to the TMDRA (FIG. 12). This operation is controlled by the order 01 and is schematically represented by the coincidence gate G86 the inputs of which are connected to the outputs 01 of TMDIP2, *f* and *s*4 of the RB and *cdlen* of the RB and the output *g*86 of which is connected to the input of the TMDRA via the mixer M8, the bus BA and the peripheral register PRA1.

From the above it follows that in the TMDRA are stored the JA, the CDLEN and the fourth sequential order.

The interrupted program is then continued. Meanwhile the TMD interconnects the junctor and the called line, found by means of the JA and the CDLEN received respectively, and when this operation is finished the output lead *eoo* of the TMDRA (FIG. 12) is activated. When the TMDIB is in its set condition the program taking place is interrupted and a TMD subprogram TMDIP1,3 (FIG. 8) which comprises the following operations is executed:

05 (gate G31) : finding of the RB;

01 (gate G33) : transfer of the RBA from the TMDB to the TMDH thus indicating that as soon as possible a TMD interrupt program must be executed;

erasing the CDLEN stored in the IPCDLH (FIG. 10). This operation is controlled by the order 09 and is schematically represented by the coincidence gate G87 the inputs of which are connected to the outputs 09 of the TMDIP3 and *24* of the RB and the output *g*87 of which is connected to the erase input of the IPCDLH;

reading of the CDLEN in the RB found and transfer of this information to the ICH (FIG. 12) thus indicating that the CDLEN must be transferred to the CPB. This operation is controlled by the order 01 and is schematically represented by the coincidence gate G30 the inputs of which are connected to the outputs 01 of the TMDIP3 and *f*, *s*4 and *cdlen* of the RB and the output *g*30 of which is connected to the case CDLEN of the ICH via the mixer M22;

07 (gate G32). When stepped to its fifth position the sequential indicates that continuous ringing current and tone must immediately be sent to the subscribers. It should be noted that such continuous ringing is sent in case the normal ringing is an interrupted one constituted by short time intervals of ringing e.g. of 1 second, separated by relatively long periods of silence, e.g. of 3 seconds. In the latter case the called subscriber might have to wait a relatively long time interval of maximum 3 seconds before hearing a ringing signal. Therefore continuous ringing is applied for a short time immediately after the connection with the called subscriber has been established.

Due to the ICH containing the CDLEN and when the other necessary conditions are fulfilled and OIS starts and IOIP (FIG. 9). During the execution of this fourth IOIP for the call treated (*ioi*4 activated) the CDLEN stored in the ICH is transferred to the IRAB via the coincidence gate G83 as described above for the third IOIP.

The interrupted program in the CPA is then continued. Meanwhile the CDLEN stored in the IRAB is transferred to the IMB' of the processor CPB during an IIIP' (*iii'*4 activated—FIG. 14) and via the coincidence gate G84. Also this program is not described in detail since it is analogous to the third IIIP' described above. When received in the IMB' of the CPB the CDLEN permits to erase the CDLEN inscribed in the IPCDLH'.

Due to the TMDH containing information and when the other required conditions are fulfilled a TMDIS (FIG. 12) appears at the output of the gate G26 so that the program taking place is interrupted and that a program TMDIP1,2 (FIG. 7) is executed which comprises the following above described operations:

03 : setting of the BIB;

05 (gate G27) : finding of the RB;

01 (gate G28) : transfer of the RBA from the TMDH (FIG. 12) to the TMDB (FIG. 12); and the following other operation which consists in reading the fifth sequential order (send continuous ringing current and tone) in the RB and transfer of the order to the TMDRA (FIG. 12). This operation is controlled by the order 01 and is schematically represented by the coincidence gate G88 the inputs of which are connected to the outputs 01 of TMDIP2, *f* and *s*5 of the RB and the output *g*88 of which is connected to the input of the TMDRA via the mixer M8, the bus BA and the peripheral register PRA1.

The interrupted program is then continued. Meanwhile the TMD sends continuous ringing tone and current to the subscribers and when this control operation is finished the output lead *eoo* of the TMDRA is activated for the fifth time. When all TMDIB is in its set condition the program taking place is interrupted and a TMD subprogram TMDIP1,3 which comprises the following above described operations is executed:

05 (gate G31) : finding of the RB;

reading of a special memory block MB3 of the central memory wherein the address ARBA of a free auxiliary register buffer ARB (FIG. 11) is stored and finding of this auxiliary register buffer ARB by means of this address. This operation is controlled by the order 05 and is schematically represented by the coincidence gate G89 the inputs of which are connected to the outputs 05 of the TMDIP3, *s*5 of the RB and *arba* of the MB3 and the output *g*89 of which is connected to the input of the ARB via the mixer M14. When the ARB has been found the schematic output *f* thereof should be activated. The ARB is used to control the timing of the continuous ringing phase. It has been preferred to use therefore an ARB instead of the RB since the latter contains a relatively large number of binary bits when compared with an ARB. Thus this RB is again available for other operations.

reading of the ARBA in the MB3 and transfer to the WR (FIG. 11). This operation is controlled by the order 01 and is schematically represented by the coincidence gate G94 the inputs of which are connected to the outputs 01 of the TMDIP3, *s*5 of the RB and *arba* of the MB3 and the output *g*94 of which is connected to the case ARBA of the WR;

setting of the timing bit TB of the ARB (FIG. 11) found, thus indicating the seizure of this ARB. This operation is controlled by the order 03 and is schematically represented by coincidence gate G90 the inputs of which are connected to the outputs 03 of the TMDIP3, *s*5 of the RB and *f* of the ARB and the output *g*90 of which is connected to the input of the case TB of the ARB;

resetting of the time counter TC of the ARB found. This operation is controlled by the order 02 and is schematically represented by the coincidence gate G91 the inputs of which are connected to the outputs 02 of the TMDIP3, *s*5 of the RB and *f* of the ARB and the output *g*91 of which is connected to the reset input *r* of the case TC of the ARB;

reading of the JA in the RB found and transfer to the ARB and to the ICH thus indicating that this JA must be transferred to the CPB. This operation is controlled by the order 01 and is schematically represented by the coincidence gate G92 the inputs of which are connected to the outputs 01 of TMDIP3, *ja* of the case JA of the RB, *f* and *s*5 of the RB and *f* of the ARB and the output *g*92 of which is connected to the cases JA of the ARB (FIG. 11) and of the ICH (FIG. 12) via the mixer M11.

reading of the JA in the RB found and finding of the corresponding JSB (FIG. 10). This operation is controlled by the order 05 and is schematically represented by the coincidence gate G95 the inputs of which are connected to the outputs 05 of the TMDIP3, *ja*, *s*5 and *f* of the RB, and the output *g*95 of which is connected to the input of the JSB via the mixer M9;

reading of the ARBA in the WR and transfer of this ARBA to the JSB. This operation is controlled by the order 01 and is schematically represented by the coincidence gate G96 the inputs of which are connected to the outputs 01 of the TMDIP3, *arba* of the WR, *f* of the JSB and *s*5 of the RB and the output *g*96 of which is connected to the case ARBA of the JSB. Due to the ARBA being inscribed in the JSB the phase thereof is modified to 010 so that the output lead *p*2 is activated. Thus it is indicated that the call handled is in the auxiliary register buffer phase;

reading of this phase P(*p*2) in the JSB and transfer of this information to the ICH (FIG. 12) thus indicating that this phase must be transferred to the CPB. This operation is controlled by the order 01 and is schematically represented by the coincidence gate G97 the inputs of which are connected to the outputs 01 of the TMDIP3, *s5* of the RB, *p2* of the JSB and *f* of the JSB and the output *g97* of which is connected to the case P of the ICH via the mixer M12;

releasing of the RB found by erasing all information inscribed therein. This operation is controlled by the order 09 and is schematically represented by the coincidence gate G111 the inputs of which are connected to the outputs 09 of the TMDIP3, *s5* and *f* of the RB and the output *g111* of which is connected to the release input of the RB;

finally, stepping of the sequential SEQ of the ARB found to its first position wherein output *s6* is activated and which indicates that immediate ringing is being sent. This operation is controlled by the order 07 and is schematically represented by the coincidence gate G75 the inputs of which are connected to the outputs 07 of the TMDP3 and *f*, and *s5*, *s7* of the ARB and the output *g45* of which is connected to the case SEQ of the ARB via the mixer M21.

Due to the ICH containing the JA and the P and when the other necessary conditions are fulfilled an OIS starts an IOIP (FIG. 9) for the fifth time for the call handled (*ioi5* activated). During the execution of this IOIP the JA and the P stored in the ICH are transferred to the IRAB via the coincidence gates G40 and G41 (FIG. 9). This interrupt program is completely analogous to the IOIP already described above and is therefore not repeated. The interrupted program in the CPA is then continued. Meanwhile the JA and the P stored in the IRAB are transferred to the IMB' of processor CPB during an IIIP' (FIG. 14) and via the coincidence gates G43 and G44. Also this program is not described in detail since it is analogous to the IIIP' described above. When received in the IMB' of the CPB the JA and the P (*p2*) permit to find the corresponding JSB' and to update the P thereof, output lead *p2* of the JSB' being then activated. Thus it is indicated that the call is in the auxiliary register buffer phase. This information P received will be used during an eventual takeover program as will be explained later.

When a base level subprogram SP6 (FIG. 5) is executed the output 1 thereof is activated when examining the above ARB since the TB thereof is found in its one-condition. Consequently the subprogram SP25 is executed, this subprogram consisting in the examination of the time counter TC of the ARB examined and in the subsequent adding of a 1 to this TC when the value indicated by this TC is smaller than $n = 2$ or in the execution of the subprogram SP26 when this value is equal to $n = 2$. The above subprogram SP25 is constituted by the order 06 and is schematically represented by the coincidence gate G98 the inputs of which are connected to the output 06 of the SP25 and *tc2* and *f* of the ARB and the output *g98* of which is connected to the subprogram SP26 and to the step input *st* of the case TC of the ARB via the inverter *i1*, it being supposed that the output *tc2* of the ARB is only activated when the above value indicated by the TC is equal to $n = 2$. Hence the TC of the ARB will be stepped as long as the latter value is not obtained.

Since the TC of the ARB is in its position 0 a 1 is added during the first execution of the base level subprogram SP6, SP25 (FIG. 5) after the seizure of the ARB. This is also the case during the second execution of the following subprogram SP6—SP25 wherein the TC is stepped to the position $n = 2$. During the subsequent subprogram SP6, SP25 i.e. the third after the seizure of the ARB the value indicated by the TC is found to be equal to $n = 2$ so that the output *g98* of the gate G98 is activated and that the subprogram SP26 is executed. It should be noted that the time elapsed between the seizure of ARB and the moment the TC of this ARB is found in its second position is approximately comprised between 308 and 462 milliseconds since the TC of the ARB may have been consulted for the first time approximately 0 msec. or 154 msec. after the seizure of the ARB. The subprogram SP26 comprises the following operations:

stepping of the sequential SEQ of the ARB (FIG. 11) examined to its following position wherein the output *s7* is activated and which indicates that the continuous ringing must be stopped and that interrupted ringing must be sent to the calling and called subscribers. This operation is controlled by the order 07 and is schematically represented by the coincidence gate G99 the inputs of which are connected to the outputs 07 of the SP26 and *f* of the ARB and the output *g99* of which is connected to the input of the case SEQ of the ARB via the mixer M21;

reading of the ARBA of the ARB examined, this address being provided by the SP6 (output *arba*), and transfer of this information to the TMDH (FIG. 12) thus indicating that a TMD interrupt program must be executed as soon as possible. This operation is controlled by the order 01 and is schematically represented by the coincidence gate G136 the inputs of which are controlled by the outputs 01 of the SP26 and *arba* of the SP6 and the output *g136* of which is connected to the case ARBA of the TMDH.

When at a certain moment the other conditions required are fulfilled a TMDIS appears at the output of the gate G26 due to the TMDH being filled, so that the program taking place is interrupted and that a TMD subprogram TMDIP1,2 (FIG. 7) which comprises the following operations is executed:

03 : setting of the BIB;

reading of the ARBA in the TMDH (FIG. 12) and finding of the ARB (FIG. 11) by means of this ARBA. Due to this the schematic output *f* of the ARB is supposed to be activated. This operation is controlled by the order 05 and is schematically represented by the coincidence gate G100 the inputs of which are connected to the outputs 05 of the TMDIP2, *s7* of the ARB and *arba* of the TMDH and the output *g100* of which is connected to the input of the ARB via the mixer M14;

reading of the ARBA in the TMDH and transfer of this ARBA to the TMDB (FIG. 12). This operation is controlled by the order 01 and is schematically represented by the coincidence gate G101 the inputs of which are connected to the outputs 01 of the TMDIP2, *arba* of the TMDH and *s7* of the ARB and the output *g101* of which is connected to the case ARBA of the TMDB;

reading of the SEQ (stop immediate ringing and send interrupted ringing) in the ARB found and transfer of the information read to the TMDRA. This operation is controlled by the order 01 and is schematically represented by the coincidence gate G102 the inputs of which are connected to the outputs 01 of the TMDIP2, *s7* and *f* of the ARB and the output *g102* of which is connected to the TMDRA via the mixer M8, the bus BA and the peripheral register PRA1. The interrupted program is then continued. Meanwhile the TMD stops the immediate ringing and sends interrupted ringing to the subscribers. When this operation is finished the output lead *eoo* of the TMDRA is activated for the fifth time. When all the already above described conditions are fulfilled the program taking place is interrupted and a TMD subprogram TMDIP1,3 (FIG. 7) comprising the following operations is executed:

reading of the ARBA in the TMDB and finding of the ARB. This operation is controlled by the order 05 and is schematically represented by the coincidence gate G103 the inputs of which are connected to the outputs 05 of the TMDIP3, *s7* of the ARB and *arba* of the TMDB and the output *g103* of which is connected to the input of the ARB via the mixer M14;

stepping of the SEQ of the ARB found to its third position wherein the output *s8* is activated and which indicates that interrupted ringing is being sent. This operation is controlled by the order 07 and is schematically represented by the above coincidence gate G45.

When the called subscriber answers the loop including the second junctor input J112 and the called line is closed and due to this the interrupted ringing is supposed to be automatically stopped in a classical way. This closure is detected during the execution of the clock interrupt subprogram SP2 (FIG. 3) when simultaneously examining this junctor input JI12 and the corresponding junctor input buffer JIB12. Consequently the output lead *lc* of the SP2 is activated and the CIP subprogram SP32 (FIG. 3) comprising the following operations is executed:

reading of the JA, this address being provided by the SP2 (output lead *ja*), and finding of the corresponding JSB and JIB12. This operation is controlled by the order 05 and is schematically represented by the coincidence gate G106 the inputs of which are connected to the outputs 01 of the SP32 and *ja* of the SP2 and the output *g*106 of which is connected to the input of the JSB via the mixer M9 and to the JIB12. The schematic output *f* of the found JIB12 should be activated;

setting of the bit BJ12 of the junctor input buffer JIB12 (FIG. 10) found, thus indicating the answer of the called subscriber. This operation is controlled by the order 03 and is schematically represented by the coincidence gate G105 the inputs of which are connected to the outputs 03 of the SP32 and *f* of the JIB12 and the output *g*105 of which is connected to the input of the case BJ12 of the JIB12. It should be noted that the CPB is not informed about the answer of the called subscriber but will itself detect this answer and accordingly set the bit BJ'12 in the corresponding JIB'12.

examination of the bit B inscribed in the JSB found and starting of the subprogram SP27 due to the call being handled by the CPA. This operation is controlled by the order 06 and is schematically represented by the coincidence gate G150 (FIG. 3) the inputs of which are connected to the outputs 06 of the SP32, *b* and *f* of the JSB and the output *g*150 of which is connected to the subprogram SP27. This subprogram comprises the following operations:

reading of the JA in the SP2 and transfer of this JA to the ICH (FIG. 12) thus indicating that this JA must be transferred to the CPB. This operation is controlled by the order 01 and *s* schematically represented by the coincidence gate G108 the inputs of which are connected to the outputs 05 of the SP27 and *ja* of the SP2 and the output *g*108 of which is connected to the case JA of the ICH via the mixer M11;

stepping of the phase P of the JSB found to the condition 100 wherein output *p*3 is activated, thus indicating that the call handled is in the conversation phase. This operation is controlled by the order 07 and is schematically represented by the coincidence gate G107 the inputs of which are connected to the outputs 07 of the SP27 and *f* of the JSB and the output *g*107 of which is connected to the case P of the JSB;

reading of the conversation phase P(*p*3) in the JSB and transfer of this phase to the ICH (FIG. 12). This operation is controlled by the order 01 and is schematically represented by the coincidence gate G109 the inputs of which are connected to the outputs 01 of the SP27 and *p*3 of the JSB and the output *g*109 of which is connected to the input P of the ICH via the mixer M12.

reading of the ARBA in the JSB and finding of the ARB by means of the ARBA. This operation is controlled by the order 05 and is schematically represented by the coincidence gate G110 the inputs of which are connected to the outputs 05 of the SP27 and *arba* and *f* of the JSB and the output *g*110 of which is connected to the ARB via the mixer M14;

releasing of the ARB found by erasing all the information inscribed therein. This operation is controlled by the order 09 and is schematically represented by the coincidence gate G138 the inputs of which are connected to the outputs 09 of the SP27 and *f* of the ARB and the output *g*138 of which is connected to the release input of the ARB: .

The interrupted program is then continued. Due to the ICH containing the JA and the P(*p*3) and when the other necessary conditions are fulfilled an OIS starts an IOIP. During the execution of this IOIP for the sixth time the JA and the P stored in the ICH (FIG. 12) are transferred to the IRAB (FIG. 13) via the coincidence gates G40 and G41. This interrupt program is completely analogous to the IOIP already described above and is therefore not repeated. The interrupted program is then continued. Meanwhile the JA and the P stored in the IRAB are transferred to the IMB' (FIG. 14) of processor CPB during an IIIP' (FIG. 14) via the coincidence gates G43 and G44. Also this program is not described in detail since it is analogous to the IIIP' described above. When received in the IMB' of the CPB the JA and the P permit locating the corresponding JSB' and updating the P thereof. Due to this the output *p*3 of the JSB' is activated thus indicating that the call is in the conversation phase. This information P will be used during a takeover program as will be explained later.

Figure 2:
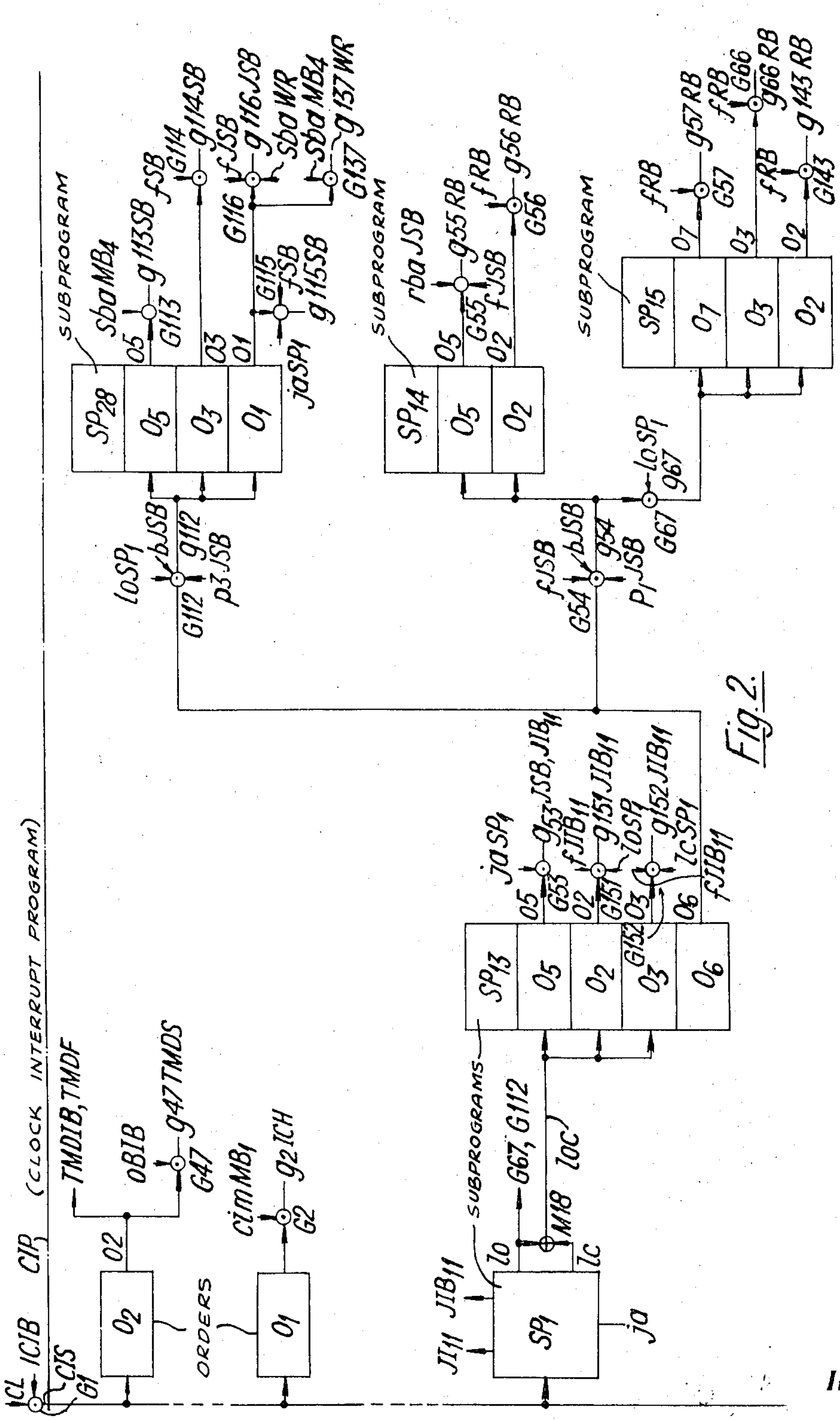
Figure 3:
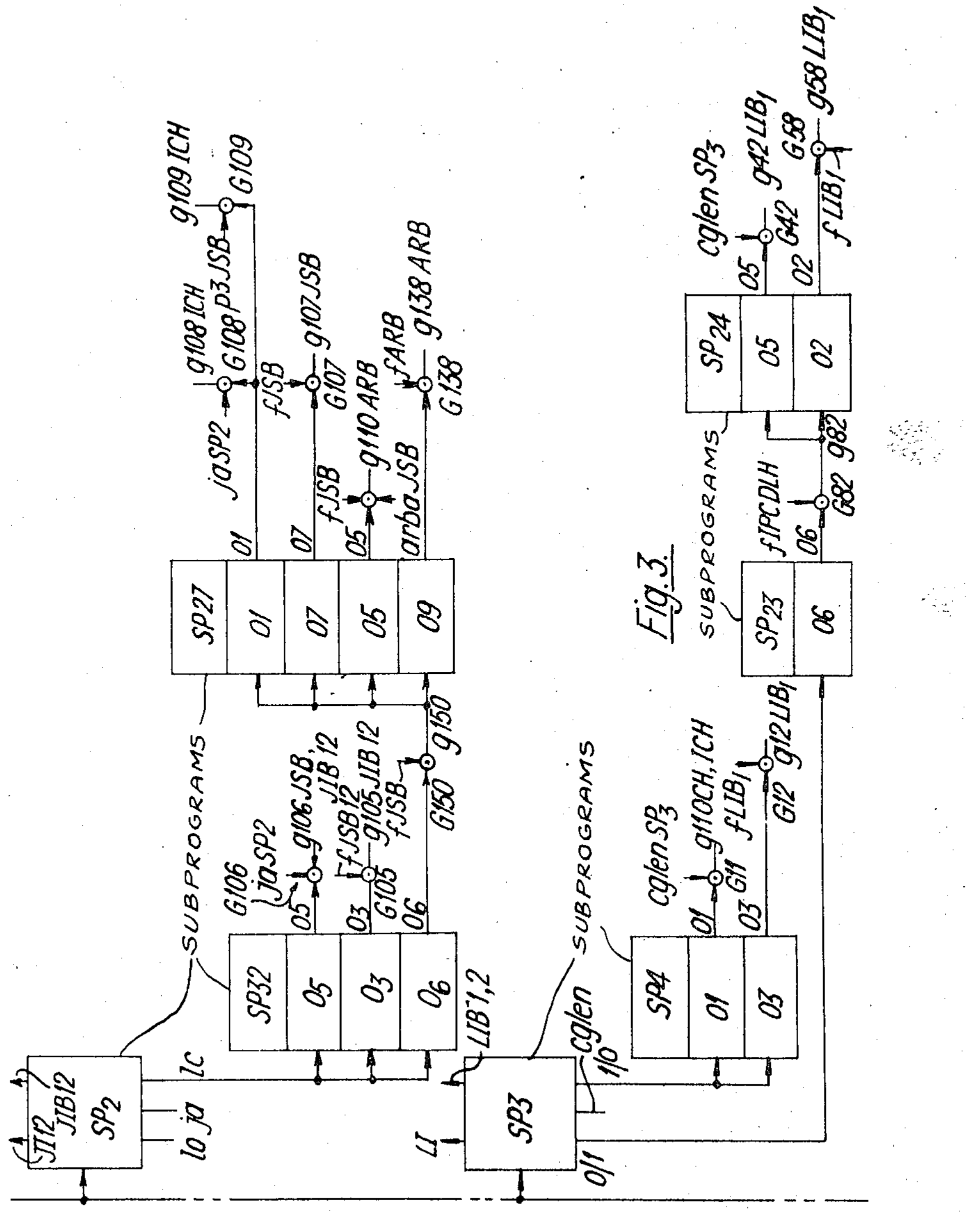
Figure 4:
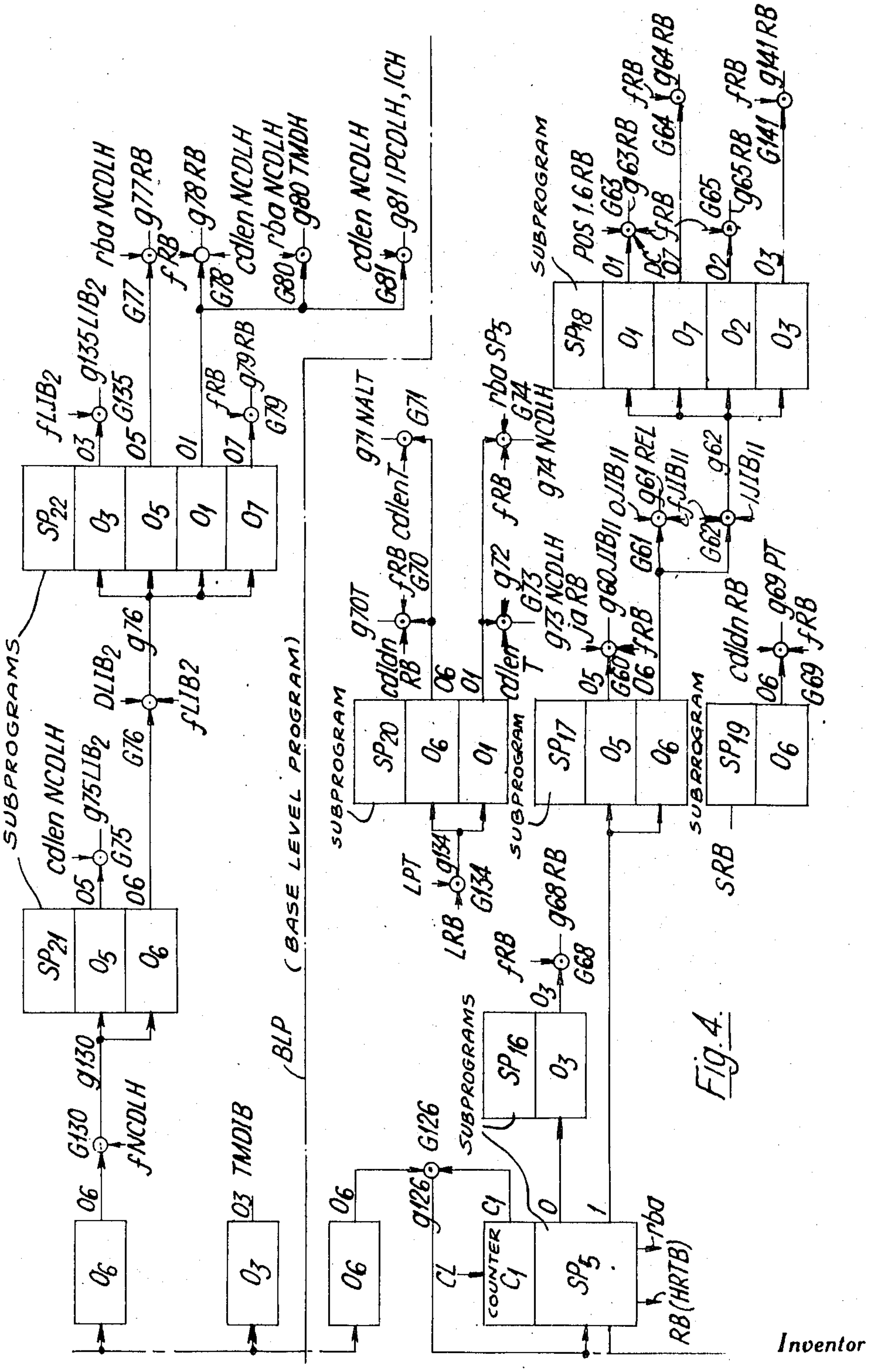
Figure 5:
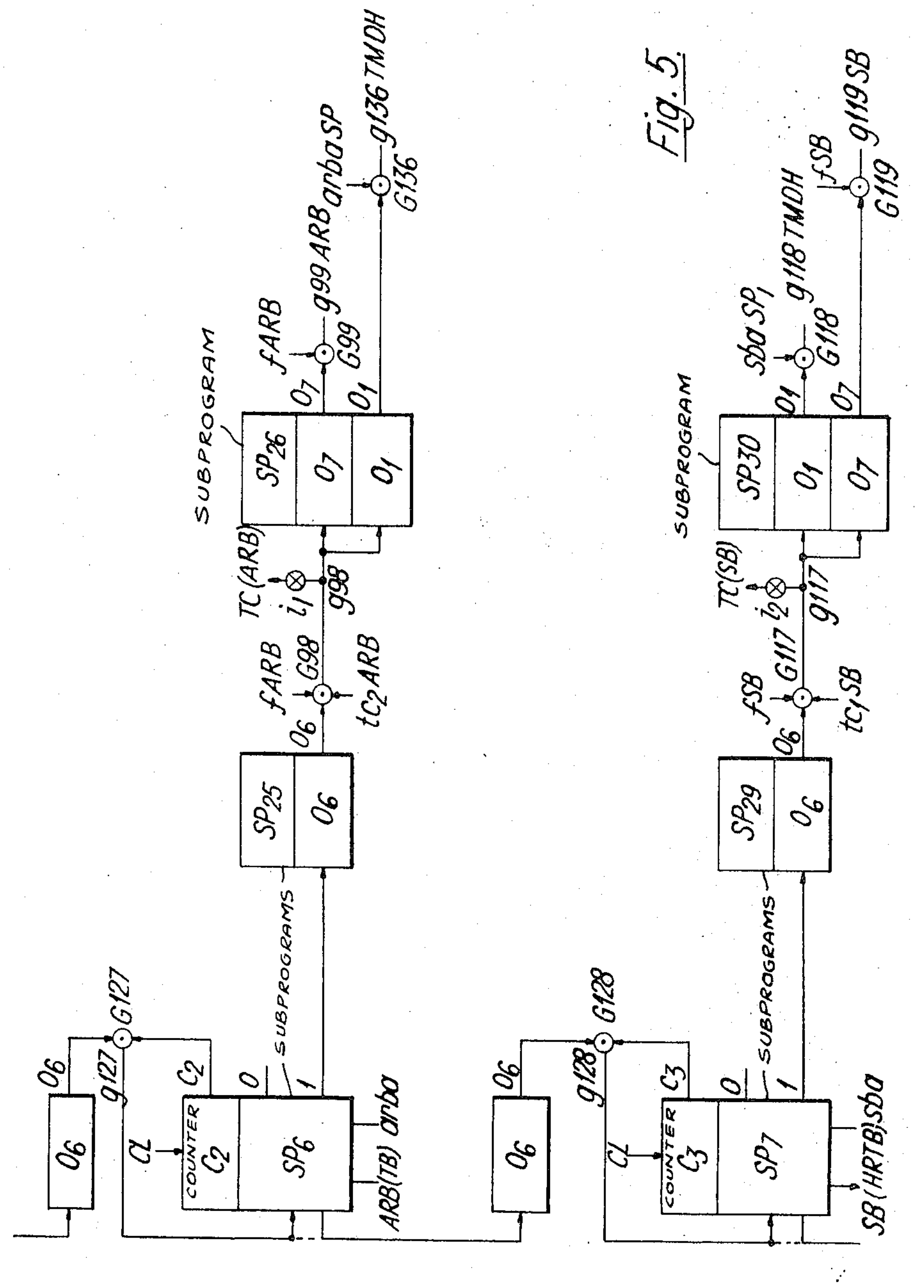
Figure 6:
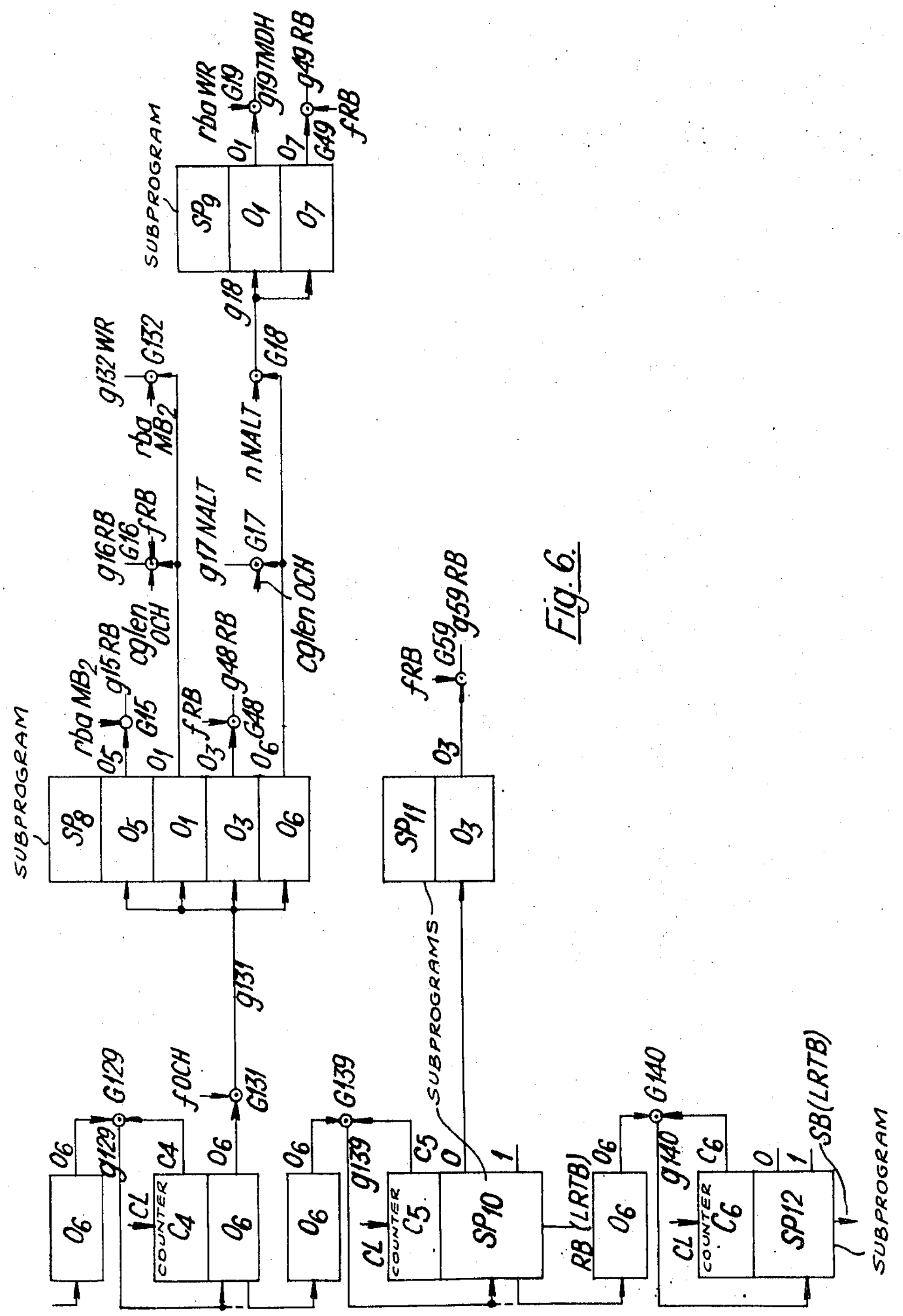

When at the end of a conversation the calling subscriber first hooks on his telephone the junctor loop including the calling line and the junctor input JI11 is opened. This is detected during the execution of a clock interrupt program SP1 (FIG. 1) due to both the output leads *lo* and *loc* being activated during the examination of the corresponding JI11 and BJ11. When the output *loc* is activated the subprogram SP13 is started and executed, this subprogram comprising the following operations:

05 (gate G53) : finding of the JSB and the JIB11;

resetting of the bit BJ11 in the JIB11 (FIG. 10) examined. This operation is controlled by the order 02 and is schematically represented by the coincidence gate G151 the inputs of which are connected to the outputs 02 and *lo* of the SP13 and *f* of the JIB11 and the output *g*151 of which is connected to the reset input *r* of the JIB11;

examination of the bit B and the phase P(*p*3) inscribed in the JSB found and starting of the subprogram SP28 due to the output lead *lo* being activated and the call being in the conversation phase and handled by CPA. This operation is controlled by the order 06 and is schematically represented by the coincidence gate G112 (FIG. 2) the inputs of which are connected to the outputs 06 of SP3, *lo* of SP1 and *b* and *p*3 of the JSB and the output *g*112 of which is connected to the subprogram SP28 (FIG. 2). This subprogram comprises the following operations:

reading of a special memory block MB4 of the central memory wherein the address SBA of a free supervision buffer SB (FIG. 11) is stored and finding of this supervision buffer by means of the address. This operation is controlled by the order 05 and is schematically represented by the coincidence gate G113 the inputs of which are connected to the outputs 05 of the SP28 and *sba* of the MB4 and the output *g*113 of which is connected to the SB via the mixer M2. When found the schematic output *f* of the SB is supposed to be activated. The SB is used to control the release operations;

setting of the high rate timing bit HRTB of the SB found. This operation is controlled by the order 03 and is schematically represented by the coincidence gate G114 the inputs of which are connected to the outputs 03 of the SP28 and *f* of the SB, and the output *g*114 of which is connected to the case HRTB of the SB;

reading of the JA, this address being provided by the SP1 (output lead *ja*), and transfer of this JA to the SB found. This operation is controlled by the order 01 and is schematically represented by the coincidence gate G115 the inputs of which are connected to the outputs 01 of the SP28, *f* of the SB and *ja* of the SP1 and the output *g*115 of which is connected to the case JA of the SB;

reading of the SBA in the MB4 and transfer of this information to the WR (FIG. 11). This operation is controlled by the order 01 and is schematically represented by the coincidence gate G137 the inputs of which are connected to the outputs 01 of the $\overline{SP28}$ and *sba* of the MB4 and the output *g*137 of which is connected to the case SBA of the WR;

reading of the SBA in the WR and transfer of this SBA to the JSB found. This operation is controlled by the order 01 and is schematically represented by the coincidence gate G116 the inputs of which are connected to the outputs 01 of the SP28, *sba* of the WR and *f* of the JSB and the output *g*116 of which is connected to the case SBA of the JSB. Upon the receipt of this address in the JSB the phase P thereof is modified to 011 so that output *p*4 is activated, thus indicating that the call is in the supervision phase.

When during a subsequent base level subprogram SP7 (FIG. 5) the bit HRTB of the supervision buffer SB is found in its set condition the output 1 of the SP7 is activated due to which the subprogram SP29 is executed. This subprogram consists in the examination of the time counter TC of the SB examined and in the adding of a 1 to this TC, when the value indicated by this TC is smaller than $n = 1$, or in the execution of the subprogram SP30 when this value is found equal to $n = 1$. It should be noted that $n = 1$ corresponds to a time interval comprised between 154 and 308 milliseconds since when the HRTB of the SB is in its set condition the TC thereof is examined every 154 milliseconds. The above subprogram SP29 consists in the order 06 and is schematically represented by a coincidence gate G117 the inputs of which are connected to the outputs 06 of the SP29 and *tc*1 and *f* of the SB and the output *g*117 of which is connected to the subprogram SP30 and to the step input *st* of the case TC of the SB via the invertor *i*2, it being assumed that the output *tc*1 of the SB is only activated when the above value of the TC is equal to $n = 1$. Hence the TC of the SB is stepped as long as the latter value is not obtained.

Since the TC of the SB is in its position 0 a 1 is added during the first execution of the base level subprogram SP29 after the seizure of SB. But during the following subprogram SP29 the value of the TC if is found equal to $n = 1$ so that the output *g*117 of the Gate G117 is activated and that the subprogram SP30 comprising the following operations is executed:

reading of the address SBA of the supervision buffer SB (FIG. 11) examined, this address being provided by the SP7 (output lead *sba*), and transfer of this address to the TMDH, thus indicating that a TMD interrupt must be executed as soon as possible. This operation is controlled by the order 01 and is schematically represented by the coincidence gate G118 the inputs of which are connected to the outputs 01 of the SP30 and *sba* of the SP7 and the output *g*118 of which is connected to the TMDH (FIG. 12);

stepping of the SEQ of the SB examined to its position wherein output *s*9 is activated. This operation is controlled by the order 07 and is schematically represented by the coincidence gate G119 the inputs of which are controlled by the outputs 07 of the SP30 and *f* of the SB and the output *g*119 of which is connected to the case SEQ of the SB via the mixer M20. The stepped sequential indicates that the connection between the calling and called subscribers must be released. The interrupted program is then continued, and when at a certain moment the other conditions required are fulfilled a TMDIS appears at the output of the gate G26 due to the TMDH being filled, so that the program taking place is interrupted and that TMD subprogram TMDIP1,2 (FIG. 7) comprising the following operations is executed:

03 : setting of the BIB;

reading of the SBA in the TMDH and finding of the SB—(FIG. 11) by means of this SBA. This operation is controlled by the order 05 and is schematically represented by the coincidence gate G120 the inputs of which are connected to the outputs 05 of the TMDIP2, *s*9 of SB, and *sba* of the TMDH and the output *g*120 of which is connected to the input of the SB via the mixer M2;

reading of the SBA in the TMDH (FIG. 12) and transfer of this SBA to the TMDB (FIG. 12). This operation is controlled by the order 01 and is schematically represented by the coincidence gate G121 the inputs of which are connected to the outputs 01 of the TMDIP2, *sba* of the TMDH and *s*9 of the SB and the output *g*121 of which is connected to the case SBA of the TMDB;

reading of the SEQ (release connection) in the SB found and transfer of this information read to the TMDRA. This operation is controlled by the order 01 and is schematically represented by the coincidence gate G122 the inputs of which are connected to the outputs 01 of the TMDIP2, *s*9 and *f* of the SB and the output *g*122 of which is connected to the TMDRA via the mixer M8, the bus bar BA and the peripheral register PRA1.

reading of the JA in the SB found and transfer of this information read to the TMDRA. This operation is controlled by the order 01 and is schematically represented by the coincidence gate G142 the inputs of which are connected to the outputs 01 of the TMDIP2, *s*9 and *f* of the *sb* and the output *g*142 of which is connected to the TMDRA via the mixer M8, the bus bar BA and the peripheral register PRA1.

From the above it follows that the JA and the ninth sequential order (release connection) are inscribed in the TMDRA. The interrupted program is then continued. Meanwhile the TMD releases the connection by releasing the junctor found by means of JA and when this operation is finished the output lead *eoo* of the TMDRA is activated for the sixth time. When all the already above described conditions are fulfilled the program taking place is interrupted and a TMD interrupt program TMDIP1,3 comprising the following operations is executed:

reading of the SBA in the TMDB (FIG. 12) and finding of the SB. This operation is controlled by the order 05 and is schematically represented by the coincidence gate G123 the inputs of which are connected to the outputs 05 of TMDIP3, *s*9 of the SB and *sba* of the TMDB and the output *g*123 of which is connected to the input of the SB via the mixer M2;

reading of the JA in the SB found and transfer of this address to the ICH thus indicating that this information must be transferred to the CPB. This operation is controlled by the order 01 and is schematically represented by the coincidence gate G124 the inputs of which are connected to the outputs 01 of the TMDIP3 and *ja*, *s*9 and *f* of the SB found and the output *g*124 of which is connected to the case JA of the ICH via the mixer M11;

reading of the JA in the SB found and finding of the corresponding JSB. This operation is controlled by the order 05 and is schematically represented by the coincidence gate G145 the inputs of which are connected to the outputs 05 of TMDIP3, *ja*, s9 and *f* of the SB found and the output *g*145 of which is connected to the input of the JSB via the mixer M9;

releasing of the JSB found by erasing all the information inscribed therein. This operation is controlled by the order 09 and is schematically represented by the coincidence gate G146 the inputs of which are connected to the outputs 09 of the TMDIP3, *s*9 of the SB and *f* of the JSB and the output *g*146 of which is connected to the release input of the JSB;

releasing of the SB by erasing all the information inscribed therein. This operation is controlled by the order 09 and is schematically represented by the coincidence gate G125 the inputs of which are connected to the outputs 09 of the TMDIP3, *s*9 and *f* of the SB and the output *g*125 of which is connected to the release input of the SB.

Due to the JA being stored in the ICH and when the other necessary conditions are fulfilled, an OIS starts an IOIP (FIG. 9; seventh time for the call treated) during which this JA and an associated indication (not shown) (release phase) of the fact that the connection has been released is transferred to the IRAB via the coincidence gate G40. From the IRAB the JA is further transferred to the IMB' of the CPB via the coincidence gate G43 during an IIIP'. The JA permits to find the corresponding JSB' and the above indication permits to erase (not shown) the contents of this buffer.

The interrupted program is then continued and when during a clock interrupt subprogram SP3 (FIG. 3) the condition 0/1 is detected for the above released calling line, the subprogram SP23 which consists in the examination of the IPCDLH is executed. Since this IPCDLH does not contain the calling line number the output *g*82 of the gate G82 is activated and the subprogram SP24 is started. The latter subprogram consists in the following operations:

- reading of the CGLEN, this information being provided by the SP3 (output lead *cglen*) and finding of the LIB1 (FIG. 10), by means of this CGLEN. This operation is controlled by the order 05 and is schematically represented by the coincidence gate G42 the inputs of which are connected to the outputs 05 of the SP24 and *cglen* of the SP3 and the output of which is connected to the input of the LIB1;
- resetting of the bit BL1 of the LIBI found thus indicating the release of the line. This operation is controlled by the order 02 and is schematically represented by the coincidence gate G58 the inputs of which are connected to the outputs 02 of the SP24 and *f* of the LIB1 found and the output *g*58 of which is connected to the reset input *r* of the case BL1 of the LIBI.

The processor CPB also resets the bits BJ'11 and BL'1 during clock interrupt programs in the same manner as described above for the CPA.

When subsequently the called subscriber releases the bits BJ12 and BL2 in the CPA and the bits BJ'12 and BL'2 in the CPB are reset during clock interrupt program in the same manner as described above for the bits BJ11, BL1, BJ'11 and BL'2.

When at the end of a conversation the called subscriber instead of the calling subscriber first hooks on his telephone, the connection between calling and called subscribers is released in an analogous manner as described above, with the exception that instead of the HRTB the LRTB of the SB is set upon the detection of the junctor loop opening by the corresponding program SP3. Consequently the LRTB will be found in its set condition during a base level subprogram SP12 which is executed every 2 minutes so that the release of the called line will be slower than in the case when the calling subscriber releases.

From the above description it follows that the processor CPA, and this is obviously also the case for the processor CB, does not use the information inscribed in the junctor status buffers when the other processor operates correctly. This information is only used when the other processor is faulty, as will be described hereinafter.

Principally referring to FIG. 14, when during the operation of the processor CPB its bistate device PAOO has been set this means that the processor CPA is faulty, as already described above with reference to FIG. 1. When during a base level maintenance program in the CPB the PAOO is examined and found in its one-condition the following takeover subprogram TOSP'1 is executed, this subprogram consisting in the examination of the bit B, indicating by what processor the call is handled and of the phase P of all the JSB'. For each call connection this subprogram TOSP'1 consists in the order 06 and is schematically represented by the coincidence gates G'1 and G'2 first and second inputs of which are connected to the outputs 06 of the TOSP'1 and *b* of the JSB' examined, the latter output *b* being activated when the bit B inscribed therein is in its set condition indicating that the call is handled by the other processor. The third input of the gate G'1 is connected to the output *m*'1 of the mixer M'1, this output being activated when the phase in the JSB' examined (output *f* activated) is a register phase (*p*1 activated) or an auxiliary register phase (*p*2 activated), whereas the third input of the gate G'2 is connected to the output *p*3 of the JSB' examined, the latter output being activated when the phase is a conversation phase. The fourth input of the gates G'1 and G'12 should be activated when the JSB' is examined, the schematic output *f* of the latter being then activated. The outputs *g*'1 and *g*'2 of the gates G'1 and G'2 are connected to the takeover subprograms TOSP'2 and TOSP'3 respectively. When the output of the gate G'1 is activated the TOSP'2 which comprises the following operations is executed:

- reading of the address RBA' of a free register buffer RB' in a special memory block MB'1 of the central memory and finding of this register buffer RB' by means of this address. This operation is controlled by the order 05 and is schematically represented by the coincidence gate G'3 the inputs of which are connected to the outputs 05 of the TOSP'2 and *rba'* of the MB'1 and the output *g*'3 of which is connected to the input of the RB'. When found the schematic output *f* of the RB' is supposed to be activated;
- reading of the RBA' in the MB'1 and transfer of this information to the work register WR'. This operation is controlled by the order 01 and is schematically represented by the coincidence gate G'4 the inputs of which are connected to the outputs 01 of the TOSP'2 and *rba'* of the MB'1 and the output *g*'4 of which is connected to the case RBA' of the WR';
- reading of the JA, this address being provided by the TOSP' (output *ja*) and transfer of this address to the RB' found: This operation is controlled by the order 01 and is schematically represented by the coincidence gate G'7 the inputs of which are connected to the outputs 01 of the TOSP'2 *ja* of the TOSP'1 and *f* of the RB' found and the output *g*'7 of which is connected to the case JA of the RB';
- stepping of the sequential of the RB' found to the positive *s*10 wherein it indicates that the connection must be released. This operation is controlled by the order 07 and is schematically represented by the coincidence gate G'5 the inputs of which are connected to the outputs 07 of the TOSP'2 and *f* of the RB' nd the output *g*'5 of which is connected to the input of the case SEQ of the RB';
- reading of the RBA' in the WR' and transfer of this RBA' to the TMDH' thus indicating that a TMD interrupt program must be executed as soon as possible. This operation is controlled by the order 01 and is schematically represented by the coincidence gate G'6 the inputs of which are connected to the outputs 01 of TOSP'2 and *rba'* of the WR' and the output *g*'6 of which is connected to the case RBA' of the TMDH'. The interrupted program in the CPB is then continued and when at a certain moment all the required conditions are fulfilled a TMD program TMDIP'1,2 (not shown) is executed during which the RBA' is read in the TMDH' and the RB' is found by means of this RBA'. In this RB' the JA and the SEQ (*s*10) order are read and transferred to the TMDRB (not shown) due to which the TMD' will release the connection by releasing the junctor found by means of the JA. At the end of this operation a TMD end-of-operation program TMDIP'1,3 is executed during which the RB' is released. It should be noted that these TMD programs are completely analogous to those described above in connection with a release of the connection after the calling subscriber has hooked on his telephone. Also the line and junctor bits in the CPB are reset during clock interrupt subprograms.

From the above it follows that the CPB releases all call connections which are in their register and auxiliary register phases by releasing the junctors included in these connections.

When the output *g*'2 of the gate G'2 is activated the TOSP'3 is executed for each call connection. During this subprogram:

- the bit B of the JSB' examined in reset thus indicating that the call is now handled by the processor CPB. This operation is controlled by the order 03 and is schematically represented by the block 03 the output 03 of which is connected to the reset input r of the case B of the JSB' (FIG. 14);

the bits BJ'11 and BJ'12 of the junctor input buffers JIB'11 and JIB'12 corresponding to the JSB examined are both set. This operation is controlled by the order 02 and is schematically represented by a block the output 02 of which is connected to the set inputs s of the cases BJ'11 and BJ'12 of the JIB'11 and the JIB'12 respectively. It should be noted that the bits BJ'11 and BJ'12 are normally in their one-condition during the conversation phase so that the above setting operation will normally in fact modify nothing.

The processor CPB hence maintains all the connections which are in the conversation phase. It will release these connections when one of the subscribers releases, in the same manner as described above for the CPA.

Summarizing, all the calls treated by the CPA and which are in the register phase or auxiliary register phase are immediately released by the CPB, whereas all the calls treated by this CPA and which are in the conversation phase are maintained in this phase by the CPB. The latter processor will not only maintain the latter calls but will also handle the newly made calls as if nothing happened. Only the quality of service of the complete traffic ensured will be somewhat decreased when processor CPA is put out of service during a busy hour.

The above setting operation of the bits BJ'11 and BJ'12 by the subprogram TOSP'3 is necessary for the following reason. As described above, when one of the subscribers engaged in a call treated by processor CPA hooks on his telephone e.g. the calling one, the corresponding junctor loop opening is detected during a clock interrupt program SP1. Consequently during a clock interrupt subprogram SP13 the corresponding bit BJ11 is reset, before the effective release of the connection. Only afterwards, more particularly after the execution of the SP28 the connection is effectively released by the TMD which releases the junctor. Also in processor CPB the corresponding bit BJ'11 is reset during a clock interrupt program before the connection has been effectively released. Hereby it should be noted that processor CPB itself cannot release the connection since the program SP'28 corresponding to SP28 cannot be executed when the bit B of the JSB' is in its set condition indicating that the call is handled by the CPA. Suppose now that the above calling subscriber has hooked on his telephone and that the bits BJ11 and BJ'11 both have already been reset in the CPA at the moment processor CPA becomes faulty but that the connection has not yet effectively been released at that moment. During the subsequent takeover program, and supposing that the bits BJ11 and BJ12 are not reset, the CPB will consult the corresponding JSB', will detect that the call is still in the conversation phase (TOSP'1) since this phase has not been modified and will reset (TOSP'3) the bit B of this JSB'. As a consequence thereof during subsequent clock interrupt programs SP1 the release will not be detected in the CPB. Indeed, the junctor loop including the calling line and the junctor input JI11 is open and the corresponding junctor bit BJ'11 has already been reset so that there exists no mismatch when comparing the conditions of BJ11 and JI11. Hence the connection will remain erroneously established although the calling subscriber has released the connection. On the contrary, when the bit BJ'11 is set during takeover program TOSP'3, as described above the junctor loop opening upon a release of the calling subscriber will be detected by the CPB during a clock interrupt program SP'1 and the connection will be released. A same reasoning applies when the called subscriber has released the connection.

While the principles of the invention have been described above in connection with specific apparatus, it is to be clearly understood that this description is made only by way of example and not as a limitation on the scope of the invention.

We claim:

1. Automatic telecommunication switching system comprising:

a switching network and a programmed control system for said switching network;

said control system including at least two identical and equal status programmed processors which simultaneously and actively control the whole of said network;

transmission means for transmitting information concerning communication control operations performed in said switching network by each one of said processors to at least one of the other processors, said transmitted information enables said other processor to further handle the communication control operations previously undertaken by each said one processor when the latter becomes faulty; and each said processor includes memory means to store information words regarding communication control operations and each information word contains an indication of the processor handling the corresponding communication control operation each processor normally using only the words associated thereto.

2. Automatic telecommunication switching system according to claim 1 wherein when a said one processor becomes faulty each of said other processors starts a takeover operation, the system including means for interrogating its said memory means to detect the words stored therein with an indication that they concern communication control operations handled by the faulty processor and means for taking over these communication control operations by means of the information stored in these words.

3. Automatic telecommunication switching system according to claim 2 wherein said information transmitted prevents said other processor from performing the communication control operations undertaken by each said one processor during its normal operation.

4. Automatic telecommunication switching system according to claim 3 in which said transmitted information includes identities of circuits involved in said communication control operations, and said transmitted information includes orders to be executed in circuits to be found in said other processor by means of said identities.

5. Automatic telecommunication switching system according to claim 4 in which said transmitted information includes data to be inscribed in said circuits found under control of said orders, and said data concerns the phase at which the processing of said communication control operations has arrived.

6. Automatic telecommunication switching system according to claim 5 in which a said communication control operation performed in said switching network by a said one processor includes means to control a call connection between calling and called stations through a junctor and other switching means of said switching network, each such means to control a call connection include a register phase during which said connection is established, a conversation phase during which said connection is maintained and a release phase during which said connection is released.

7. Automatic telecommunication switching system according to claim 6 wherein said information words of a processor are each permanently associated to a said junctor involved in a call connection, and when the identity of a said junctor and the indicatives of said register phase or of said conversation phase are received together with accompanying orders, the orders control the finding of the finding of the corresponding information word by means of this identity as well as the storage therein of said indicatives.

8. Automatic telecommunication switching system according to claim 6 wherein said information words of a processor are each permanently associated to a said junctor involved in a call connection and that when the identity of a said junctor and the indicative of said release phase are received together with accompanying orders, said orders control the finding of the corresponding information word by means of this identity as well as the erasing of this information work.

9. Automatic telecommunication switching system according to claim 6 in which said memory means of a processor store a plurality of second information words each including one or more bits and each permanently associated to a said station involved in a call connection and that when the identity of a said station is received together with accompanying orders, said orders control the finding of the corresponding second information word by means of said identity as well as the setting of this second information word in a condition indicating that the corresponding station is busy.

10. Automatic telecommunication switching system according to claim 9 wherein each said other processor, after having detected the first words stored therein with an indication that they concern connection control operations handled by the faulty processor, read these words in order to find what processing state these call connections have reached and processes these call connections further depending on the phase read; each said other processor releases all the call connections which are found in their register phase; and each said other processor maintains all the call connections which are found in their conversation phase and modifies for each call connection maintained the indication that the call connection control operation is handled by said one processor in order that it should now indicate that the call connection control operation is handled by said other processor.

11. Automatic telecommunication switching system according to claim 9 in which said memory means of each processor store plurality of third information words each permanently associated to an input of said junctor and each of which stores the condition of the loop between the associated junctor input and a said station involved in a call connection, and said other processor sets all the third information words associated to junctors involved in call connections which are found in their conversation phase in a condition indicating that the corresponding loop is closed irrespective of the actual state thereof.

12. Automatic telecommunication switching system according to claim 1 including fault detection means comprising means for counting the number of calls treated in each processor, means for comparing the respective numbers counted by any two processors, and means for indicating as faulty to the other processor that processor which has counted the smaller number of calls treated, when the difference between said numbers reaches a predetermined value for a given maximum value of said numbers.

13. Automatic telecommunication switching system according to claim 12 wherein each processor includes fault detection means comprising a first accumulator adapted to count the difference between the number of calls treated by the two processors, the number of the other processor being coupled by said transmission means, and a second accumulator adapted to count the number of calls treated by one of said two processors, whereby said fault detection means react to said first accumulator reaching a first or a second predetermined value, when said second accumulator has not exceeded a third predetermined value, to indicate that one or the other processor is faulty.

14. Automatic telecommunication switching system according to claim 1 including fault detection means comprising means for comparing the number of transmissions of said information from one processor to another processor with the number of transmissions of said information from said other processor to said one processor and for indicating as faulty to the other processor that processor which originates the smaller number of transmission, when the difference between said numbers reaches a predetermined value for a given maximum value of said numbers.

15. Automatic telecommunication switching system according to claim 14 wherein said fault detection means includes a reversible first counter with two inputs and a second and third unidirectional counter with one input, said first counter being able to count in each direction said predetermined first value and said second and third counters being able to count a second predetermined value which is larger than the first predetermined value, said one processor is connected to one input of said first counter and to the input of said second counter, whereas said other processor is connected to the other input of said first counter and to the input of said third counter in such a manner that said reversible first counter is stepped in one direction and said second counter is stepped each time a said transmission is performed in one direction from said one to said other processor, whereas said reversible first counter is stepped in the other direction and said third counter is stepped each time a said transmission is performed in the other direction from said other to said one processor, when said second or third counter has counted said predetermined second value all said counters reset, and when said first reversible counter has counted said predetermined first value in one direction, an error indicating bistate device is set in said one processor in order to indicate that said other processor is faulty, whereas when said reversible second counter has counted said first predetermined value in said other direction another error indicating bistate device is set in said other processor in order to indicate that said one processor is faulty.

16. Automatic telecommunication switching system according to claim 15 in which said transmission means include two channels for transmitting said information between said pair of processors, said channels being unidirectional and comprising a first and a second said interprocessor register respectively, and one of said channels is connected to said one input of said first counter and to said input of said second counter, whereas the other channel is connected to said other input of said first counter and to said input of said third counter.

17. Automatic telecommunication switching system according to claim 1 wherein said memory means include a stored base level program, a stored clock interrupt program, and a stored interprocessor interrupt program; and wherein said system further includes a clock interrupt source and a plurality of interprocessor interrupt sources, said clock interrupt source when operated being able to temporarily interrupt said base level program and to start said clock interrupt program, whereas said interprocessor interrupt sources when operated are able to temporarily interrupt said base level program or said clock interrupt program and to start said interprocessor interrupt program during which said information is transmitted to at least one of the other processors by said transmission means.

18. Automatic telecommunication switching system according to claim 17 in which said base level program includes a maintenance subprogram, and said memory means further includes a stored asynchronous switching interrupt program, and in which said system includes a plurality of asynchronous switching interrupt sources which when operated are able to temporarily interrupt said base level program and to start said asynchronous switching interrupt program.

19. Automatic telecommunication switching system according to claim 18 wherein said base level program is adapted to control operations within the processor and the switching network, said clock interrupt program is adapted to control synchronous operations involving the processor and said switching network, said asynchronous switching interrupt program is adapted to control asynchronous operations involving the processor and said switching network, and said interprocessor interrupt program is adapted to control operations involving the processor and another processor.

20. Automatic telecommunication switching system according to claim 17 in which said interprocessor interrupt program of each processor comprises an interprocessor output interrupt program and an interprocessor input interrupt program, said plurality of interprocessor interrupt sources of each processor comprise an interprocessor output interrupt source and an interprocessor input interrupt source, and when an interprocessor output interrupt source is operated in a processor said interprocessor output interrupt program is executed causing said transmission means to transmit said information from this processor to said first interprocessor register, whereas when said interprocessor input interrupt program is executed in a processor said interprocessor input interrupt program is executed causing said transmission means to transmit said information to this processor from said second interprocessor register.

21. Automatic telecommunication switching system according to claim 20 in which said memory means of each of said processors further include a first memory circuit for temporarily storing said information to be transferred to said first interprocessor register and a second memory circuit for temporarily storing said information received from said second interprocessor register, said interprocessor output interrupt source is operated when simultaneously said first memory circuit contains information, said first interprocessor register is idle and no program of higher priority is effective in said one processor, and said interprocessor input interrupt source is operated when simultaneously said second interprocessor register contains information, said second memory circuit is idle and no program of higher priority is effective in said one processor.

22. Automatic telecommunication switching system according to claim 17 in which a fault detection subprogram is included in said base level program and is adapted to check the condition of this processor and to inform the other processor when the processor is faulty by setting an error indicating means in the other processor, and said fault detection subprogram is also adapted to check the condition of said error indicating means included in this processor, the detection of an error indicating means in its set condition resulting in the start of a takeover program forming part of said base level program and by means of which said takeover operation is performed.

23. Automatic telecommunication switching system according to claim 17 wherein the clock interrupt programs of said two processors start at moments which are shifted with respect to one another so that these programs are prevented from simultaneously controlling the same elements in said switching network; and said clock interrupt programs comprise sequences of operations which are executed substantially in the same predetermined order in both said processors.

24. Automatic telecommunication switching system according to claim 18 wherein said asynchronous switching interrupt program of each processor comprises a first asynchronous switching interrupt subprogram controlling the transmission of information including orders and concerning communication control operations from said processor to said switching network and a second asynchronous switching interrupt subprogram controlling the transmission of information and also concerning communication control operations from said switching network to said processor; and wherein said switching network includes switching means and a plurality of network control means which have access to the whole of said switching means and which are each permanently connected via a single second transmission means to a distinct one of said processors and that said first and second asynchronous switching interrupt subprograms of a processor control the transmission of information from said processor to the associated network control means and vice versa via said second transmission means in order that said network control means and said processor respectively should process the information received.

25. Automatic telecommunication switching system according to claim 24 in which said switching means are constituted by a plurality of network parts, whereas each said network control means is constituted by a plurality of identical network control circuits and two network control circuits, each belonging to a distinct one of said network control means, are associated in a module to a said network part and are connected to distinct ones of said processors by said second transmission means.

26. Automatic telecommunication switching system according to claim 25 in which each of the two network control circuits of a module includes an asynchronous switching control circuit which comprises a first and a second auxiliary asynchronous switching interrupt source, said first auxiliary asynchronous switching interrupt source when operated requests for the execution of a said first asynchronous switching interrupt subprogram controlling the transmission of information from the processor, associated to this network control circuit, to this asynchronous switching control circuit, said asynchronous switching control circuit is adapted to execute operations in the associated network part upon receipt of said information, and said second auxiliary asynchronous switching interrupt source when operated requests for the execution of a said second asynchronous switching interrupt subprogram controlling the transmission of information from this asynchronous switching control circuit to the associated processor.

27. Automatic telecommunication switching system according to claim 26 in which a said first auxiliary asynchronous switching interrupt source included in a module and associated to a processor may only be operated when information must be transmitted to the associated asynchronous switching control circuit, when both the asynchronous switching control circuits of the module are free and during the second half period of each time interval elapsing between the starts of two successive clock interrupt programs in said processor; and in which a said second auxiliary asynchronous switching interrupt source included in a module and associated to a processor may be operated when information must be transmitted to said processor after the execution of an operation.

28. Automatic telecommunication switching system according to claim 27 in which the outputs of the first and second auxiliary asynchronous switching interrupt sources associated to an asynchronous switching control circuit are connected to the first and second inputs of a first mixer the output of which is activated when this asynchronous switching control circuit requests for the execution of a first or a second asynchronous switching interrupt subprogram, the outputs of the first mixers associated to the various asynchronous switching control circuits associated to a same processor are connected to a second mixer the output of which constitutes the one input of a coincidence gate the other input of which is activated when no interrupt program of higher priority than the asynchronous switching interrupt program is taking place in said same processor, and when activated the output of said gate which constitutes said asynchronous switching interrupt source delivers an asynchronous switching interrupt signal which starts an asynchronous switching interrupt subprogram which consists in the scanning of the first and second inputs of said first mixer, in the selection of an activated one of these inputs and in the continuation of said first or of said second asynchronous switching interrupt subprogram in the associated asynchronous switching control circuit depending on the selected input being connected to a first or to a second auxiliary asynchronous switching interrupt source.

29. Automatic telecommunication switching system according to claim 28 wherein each said communication control operation performed in said switching network by a said processor consists in the control of a call connection between calling and called stations through a junctor and other switching means of said switching network, and said information transmitted from a said processor to an associated asynchronous switching control circuit by first asynchronous switching control interrupt subprograms may include orders to connect a junctor to the calling station, to connect feeding bridge and send dial tone to said calling station, to connect a junctor to the called station, to send continuous ringing tone and current to calling and called stations, to stop immediate ringing and send interrupt ringing, and to release connection.

30. Automatic telecommunication switching system according to claim 17 wherein said base level program comprises a plurality of subprograms which are executed at a rhythm which is a submultiple of the rhythm at which said clock interrupt programs are executed, a counter is associated to each of said base level subprograms and is stepped each time a said clock interrupt program is executed, and said base level program comprises means for examining each of said counters of said subprograms, means for executing each said subprogram when the corresponding counter has counted a predetermined value and means for resetting this counter when this subprogram is finished.

31. Automatic telecommunication switching system according to claim 30 wherein each said communication control operation performed in said switching network by said processor consists in the control of a call connection between calling and called stations through a junctor and other switching means of said switching network which includes registers, each said clock interrupt program comprises means for scanning a loop between a calling station and a junctor at a first rhythm higher than that of the loop openings and closures produced by dialing the identity of a called station and bringing a time counter bit of a register in a predetermined first condition each time a said loop opening or closure is detected, and said base level program comprises means for examining the time counter bit of said register at a second rhythm lower than that of said loop openings and closures and bringing said time counter bit in a predetermined second condition, the fact that said time counter bit is found still to be in its second condition during a said base level program indicating that a loop opening or closure at least equal to the time interval between two successive examinations of the time counter bit of said register is being detected.

32. Automatic telecommunication switching system according to claim 17 wherein a said communication control operation performed in said switching network by said processor consists in the control of a call connection between calling and called stations through said switching network which includes registers and auxiliary registers, the identity of a called station being stored in a said register and after the storage of said identity ringing is sent to said called station and a said auxiliary register including a time counter is seized, whereas said register is released and said base level program includes a subprogram which is executed at a predetermined rhythm and which causes examination of the time counter of each auxiliary register seized and in the stepping of this counter by one step unless this counter is found in a predetermined position in which case the sending of said ringing is stopped.

33. Automatic telecommunication switching system according to claim 17 in which a said communication control operation performed in said switching network by said processors consists in the control of a call connection between calling and called stations through a junctor and other switching means of said switching network which includes supervision registers and when a call connection is released in one of the stations a said supervision register having a time counter is seized and said base level program further includes a subprogram which is executed at a predetermined rhythm and which causes the examination of each supervision register seized and in the stepping of this counter by one step unless this counter is found in a predetermined position in which case said call connection is released by releasing the junctor involved in this connection.

34. Automatic telecommunication switching system comprising a switching network and a programmed control system for said switching network, said control system including at least two programmed processors which simultaneously and actively control the whole of said network, and said switching network includes switching means and a plurality of network control means which have access to the whole of said switching means and which are each permanently connected by a single transmission means to a distinct one of said processors; and said switching means are constituted by a plurality of network parts, whereas each said network control means is constituted by a plurality of identical network control circuits and two network control circuits, each belonging to a distinct one of said network control means, are associated in a module to a said network part and are connected to distinct ones of said processors by said second transmission means.

35. In an automatic telecommunication switching system including a plurality of stations, calling and called ones of which may be interconnected by junctors and other switching means, and registers, the system comprising first means to scan a loop between a calling station and a junctor at a rhythm higher than that of the loop openings and closures produced by dialing the identity of a called station and to bring a time counter bit of a said register in a predetermined first condition each time a said loop opening or closure is detected, and second means to examine the time counter bit of said register at a rhythm lower than that of said loop openings and closures and bringing said time counter bit in a predetermined second condition if it had previously been brought in said first condition by said first means, said time counter bit being found in its second condition by said second means indicates that a loop closure or opening having a duration at least equal to the time interval between two successive examinations of the time counter bit of said register is being detected.

36. An information handling system including:

at least two programmed processors which are able to simultaneously and actively perform distinct control operations;

transmission means for transmitting information concerning said control operations performed by each one of said processors to at least one of the other processors;

memory means in each one of said processors having stored therein a base level program, a clock interrupt program, and an interprocessor interrupt program; and said system further includes a clock interrupt source and interprocessor interrupt sources, said clock interrupt source when operated being able to temporarily interrupt said base level program and to start said clock interrupt program, whereas said interprocessor interrupt sources when operated are able to temporarily interrupt said base level program or said clock interrupt program and to start said interprocessor interrupt program during which said information is transmitted to at least one of the other processors by said transmission means.